US008378060B2

(12) United States Patent
Rappoport et al.

(10) Patent No.: US 8,378,060 B2
(45) Date of Patent: Feb. 19, 2013

(54) POLY(THIOESTERS), THEIR APPLICATIONS AND DERIVATIVES (75) Inventors: Leonid Rappoport, Mountain View, CA (US); Aleksander Yam, Sunnyvale, CA (US); Alexander Vainer, Fremont, CA (US)

(73) Assignee: POLYMERight, Inc., Fremont, CA (US)

( * ) Notice: Subject to any disclaimer, the term of this patent is extended or adjusted under 35 U.S.C. 154(b) by 0 days.

(21) Appl. No.: 13/427,279

(22) Filed: Mar. 22, 2012

(65) Prior Publication Data

US 2012/0238718 A1 Sep. 20, 2012

Related U.S. Application Data (60) Division of application No. 11/478,455, filed on Jun. 28, 2006, now Pat. No. 8,158,726, which is a continuation-in-part of application No. 10/826,216, filed on Apr. 16, 2004, now Pat. No. 7,087,708.

(60) Provisional application No. 60/463,123, filed on Apr. 17, 2003.

(51) Int. Cl.
*C08G 75/00* (2006.01)

(52) U.S. Cl. ......... 528/373; 528/293; 528/294; 522/104

(58) Field of Classification Search ............... 528/373, 528/293, 294; 522/104
See application file for complete search history.

(56) References Cited

U.S. PATENT DOCUMENTS

| | | | |
|---|---|---|---|
| 2,221,418 A * | 11/1940 | Weihe | 528/294 |
| 2,582,605 A | 1/1952 | Richter | |
| 3,386,963 A | 6/1968 | Santaniello | |
| 4,032,468 A | 6/1977 | Treadwell et al. | |
| 4,113,707 A | 9/1978 | Louthan et al. | |
| 4,124,645 A | 11/1978 | Bertozzi | |
| 4,131,716 A | 12/1978 | Bertozzi | |
| 4,184,890 A | 1/1980 | Bertozzi | |
| 4,764,299 A | 8/1988 | Salomon | |
| 5,043,398 A | 8/1991 | Auerbach et al. | |
| 5,098,788 A | 3/1992 | Petrie et al. | |
| 5,342,724 A | 8/1994 | Wilson | |
| 5,407,972 A * | 4/1995 | Smith et al. | 522/96 |
| 6,114,485 A | 9/2000 | Kobayashi et al. | |
| 6,369,188 B1 | 4/2002 | Rappoport et al. | |
| 6,383,324 B1 | 5/2002 | Vietti et al. | |

(Continued)

FOREIGN PATENT DOCUMENTS

EP 2420523 A1 2/2012
WO 2004094522 A2 11/2004

(Continued)

OTHER PUBLICATIONS

Provisional patent application entitled "Novel Types of Poly(thioesters) and their Applications" by Leonid Rappoport filed on Apr. 17, 2003 as U.S. Appl. No. 60/463,123.

(Continued)

*Primary Examiner* — Alicia Toscano
(74) *Attorney, Agent, or Firm* — Rodney B. Carroll; Conley Rose, P.C.

(57) ABSTRACT

A composition of the formulae $MZAORS_nR^1F^1{}_mOAZ^1M^1$, wherein O and S have their normal meaning of oxygen and sulfur, n is at least 2 and not more than 8, $F^1$ is of the formula $—OAORS_nR^1—$, m is at least 1, Z and $Z^1$ are the same or different and are oxy or amino, M and $M^1$ are the same or different and are hydrogen or an organic substituent, R and $R^1$ are the same or different and are organic divalent radicals, each having from 2 to 20 carbon atoms, and A is the residue of a dicarboxylic acid of from 2 to 40 carbon atoms.

13 Claims, 2 Drawing Sheets

Product of Interaction of Di(hydroxyethyl)polysulfide and Maleic Anhydride

U.S. PATENT DOCUMENTS 7,087,708 B2  8/2006  Rappoport et al.
8,158,726 B2  4/2012  Rappoport et al.

FOREIGN PATENT DOCUMENTS

WO  2004094522 A3  11/2004

OTHER PUBLICATIONS

Foreign communication from a related counterpart application—First Office Action and Translation, CN200810009923.8 dated Jul. 14, 2010, 5 pages.

Foreign communication from a related counterpart application—Second Office Action and Translation, CN200810009923.8 dated Aug. 31, 2011, 6 pages.

Foreign communication from a related counterpart application—International Search Report and Written Opinion, PCT/US04/11809, Apr. 8, 2005, 9 pages.

Foreign communication from a related counterpart application—Supplementary European Search Report, EP04759932.9, Apr. 27, 2009, 3 pages.

Fettes, E.M., "Progress in Polysulfide Polymers," Organic Sulfur Compounds, 1961, pp. 266-279 plus 2 pages cover and publishing information, vol. I, Pergamon Press Inc.

Foreign communication from a related counterpart application—European Search Report, EP11181666.6-2102, Jan. 19, 2012, 5 pages.

\* cited by examiner

Figure 1. Product of Interaction of Di(hydroxyethyl)polysulfide and Maleic Anhydride Figure 2. Product of Interaction of Di(hydroxyethyl)polysulfide and Adipic Acid

POLY(THIOESTERS), THEIR APPLICATIONS AND DERIVATIVES

CROSS-REFERENCE TO RELATED APPLICATIONS

This application is a divisional application to U.S. patent application Ser. No. 11/478,455 filed Jun. 28, 2006, now U.S. Pat. No. 8,158,726, now published as U.S. Patent Application Publication US 2007/0015902 A1, which is a continuation-in-part of U.S. patent application Ser. No. 10/826,216 filed Apr. 16, 2004, now U.S. Pat. No. 7,087,708, which claims priority to U.S. Provisional Application No. 60/463,123 filed Apr. 17, 2003, each of which is hereby incorporated herein by reference in its entirety for all purposes.

BACKGROUND

1. Technical Field

The present invention relates generally to synthetic chemistry. More particularly, the present invention relates to poly(thioesters), monomeric diesters and their derivatives. Further, the field of this invention is polysulfur-containing polymeric ester compositions and their polymers.

2. Background of the Invention

Despite the mature nature of the field of polymers, there remain many opportunities to create polymers having novel properties and applications. Polymers may be divided into addition polymers and condensation polymers. Among the condensation polymers are polyesters, polyethers, polyurethanes, polyamines, and polyanhydrides. These polymers find wide application in areas of molded products, lubricants, sealants, coatings, paints, films, fibers, elastomers and other formulations. Their properties vary widely depending upon the functional groups employed, both as to nature and diversity, the backbone units, the functionalities in the backbone, the molecular weight and homogeneity of molecular weight range of the polymeric molecules, and the like. Because of the great diversity of properties of the polymers, there can be numerous customized applications for the polymers, where the properties of the polymers are customized to a particular need.

Polymers containing polythioalkyl groups have not found extensive employment in the polymeric field, with the exception of the Thiokol® polymers that currently are not widely used due to environmental concerns. Yet, the presence of sulfur in the polymers can have desirable properties. Some polymeric products containing polysulfide linkages have been reported for a variety of purposes, such as polymers having disulfide and ether groups, disulfide and carbamate groups, and disulfide and acetal groups in the polymer backbone. There have been reports of other polymeric compositions, where the disulfide is in a side chain of the polymer, as in addition polymers of acrylics. While specific compounds having sulfides having greater than one sulfur are disclosed in the literature, for the most part they are not exemplified in the experimental work. Specifically, there have been no reports of polymers employing a monomeric unit of a polysulfide functionality in the backbone and formed from a combination of a polysulfide-containing diol and a dibasic acid.

Relevant Literature

Ethers of di(hydroxyethyl)sulfide and -disulfide are reported in U.S. Pat. No. 2,582,605. Polymers of alkyldisulfides terminating in hydroxyl groups and further reacted with polyurethanes are reported in U.S. Pat. No. 3,386,963. Polymers of polymerized thiodiglycol reacted to provide terminal halide groups which are then further reacted with sodium polysulfide to form a latex dispersion are reported in U.S. Pat. No. 4,124,645. Polymers of polymerized sulfide and polysulfide glycols terminated with mercaptans are reported in U.S. Pat. No. 4,764,299. U.S. Pat. No. 6,383,324 reports the polymerization of a "randomly copolymeric polyacetal of a dithiodialkylene glycol" with polyisocyanates. Sulfur substituted acrylic polymers are reported in U.S. Pat. Nos. 4,131,716 and 6,114,485.

Hydroxyl groups that are in the β-position relative to a sulfur atom in an aliphatic chain have unusually high reactivity, and their properties are significantly different from other hydroxyl groups. For example, unlike compounds with hydroxyl groups in other positions, compounds with hydroxyl groups in the β-position relative to a sulfur atom in an aliphatic chain readily undergo self-polycondensation as well as co-condensation with other glycols in the presence of other acids and/or at elevated temperatures, resulting in the formation of poly(thioethers) (F. Richter, et. al., U.S. Pat. No. 2,582,605).

Di(hydroxyethyl)disulfide, as well as other di(hydroxyethyl)polysulfides are typical compounds with hydroxyl groups in the β-position relative to a sulfur atom. They are known in the art to be precursors for various poly(thioethers), which have been used in lubricants (U.S. Pat. No. 2,582,605), in polyurethanes (U.S. Pat. No. 3,386,963), in mercaptan-terminated oligomers (U.S. Pat. No. 4,124,645), in transmission fluids (U.S. Pat. No. 4,764,299), and in acetal-functional compounds used in window insulation (U.S. Pat. No. 6,383,324).

The prior art describes several attempts to convert di(hydroxyethyl)polysulfides into various compounds that contain ester functionality adjacent to the —$(CH_2)_n$—S— segment. For example, U.S. Pat. No. 6,114,485 discloses compounds that include an —O—C(O)—$(CH_2)_2$—S— segment in monomeric products, but the chemical structure of these compounds is achieved through a chain of several complex chemical reactions that take multiple steps and over 20 hours of combined reaction time. In addition, the technology described in this patent cannot be used to produce polymeric products with multiple poly(thioester) segments.

U.S. Pat. Nos. 2,221,418 by Weihe et al. (referred to hereafter as Weihe) and 5,407,972 by Smith et al. (referred to hereafter as Smith) describe products that are produced after (polythio)glycols are mixed with dicarbonic acids and/or their anhydrides. However, these patents do not describe the formation of poly(thioesters) from these products. For example, Weihe describes the formation of an "insoluble balsam", and Smith describes "polysulfide polymers" produced as the result of the interaction between di(hydroxyethyl)polysulfides and dibasic carbonic acids or their anhydrides.

Nowhere in Weihe or Smith is described the chemical structure of the resulting products. However, based on the above-described unusual reactivity of hydroxyl groups in the β-position relative to a sulfur atom, and the strong tendency of such hydroxyl groups to homo-condense according to reaction (1), it is highly likely that the products formed by Weihe and Smith under the conditions described in these patents are poly(thioethers), rather than poly(thioesters).

In the case where the products were formed with the participation of dibasic carbonic acids, they would likely form a solution of dibasic carbonic acids in solid or semi-solid poly(thioether) resins. In the case where the products were formed with the participation of anhydrides of dibasic carbonic acids, the solid or semi-solid poly(thioether) resins would have a chance to react with anhydrides. This would allow the formation of a randomly-formed compound with no more than two radicals per molecule and a single ester structure for each radical. A regular poly(thioester) polymer would not be formed.

The absence in the prior art of the description of regular poly(thioesters) produced from compounds with hydroxyl groups in the β-position relative to a sulfur atom is further illustrated by Wilson in U.S. Pat. No. 5,342,724 (referred to hereafter as Wilson). Wilson describes the formation of multiple poly(thioesters) from sulfur-containing diols and dibasic carbonic acids. However, all sulfur-containing diols with hydroxyl groups in the β-position relative to the sulfur atoms were left out from the list of diols mentioned by Wilson, as the state-of the art technology available at the time did not allow production of poly(thioesters) from such compounds.

Accordingly, there is a need in the art to develop methods of forming poly(thioesters) from sulfur-containing diols with hydroxyl groups in the β-position relative to the sulfur atoms.

SUMMARY OF THE INVENTION

Compositions are provided comprising the condensation product of two compounds: a dibasic acid, or its anhydride and a di(hydroxysubstituted organic group)polysulfide, where the compositions have one or a plurality of units consisting of the combination of the two compounds. The compositions are formed by combining the compounds under selected acidic conditions and at a mole ratio to provide the desired product. The compositions resulting from the reaction will usually be a mixture in the absence of a large excess of one of the reactants, unless special conditions to prevent oligomerization are employed. Depending on the ratios of the two reactants the majority of molecules in the composition may have one hydroxyl and one carboxyl as terminating groups, or two hydroxyls or two carboxyls. All of these compounds may react with a wide variety of polyfunctional compounds to provide products having properties applicable for specific end purposes.

In an embodiment, the present invention provides poly (thioesters), produced from di(hydroxyethyl)polysulfides and various dibasic carbonic acids or their anhydrides, and their derivatives. The new poly(thioesters) combine properties of polyesters and polysulfides. The poly(thioesters) can be used as components in many compositions, including but not limited to adhesives, sealants, caulks, coatings, plastics, paints and elastomers.

In one embodiment, the poly(thioesters) have the formula:

wherein
each $R^2$ is H or $R^1$-f,
    wherein $R^1$ is any bi-valenced organic radical, and
    f is H or any reactive functional group;
each $R^2$ is the same or different;
A is either X or Y,
    wherein X is $—(—(CH_2)_2—S_x—(CH_2)_2—O—)_m—(CH_2)—_2—S_x—(CH_2)_2—$,
    Y is $—C(O)—R^1—C(O)—$,
    m is at least zero, and
    x is between two and six;
B is either Y or X;
O, H, C, and S have their normal meaning of oxygen, hydrogen, carbon, and sulfur;
if A is X, then B is Y;
if A is Y, then B is X; and n is at least one, except for the case when A is Y, B is X, $R^1$ is a dibasic carbonic acid that is a cyclic anhydride or forms a cyclic anhydride, and $R^2$ is H, in which case n is at least two.

In another embodiment, the poly(thioesters) have the formula:

wherein
A is $—C(O)—R^1—C(O)—$;
B is $—((CH_2)_2—S_x—(CH_2)_2—O—)_m—(CH_2)_2—S_x—(CH_2)_2—$;
$R^1$ is any bi-valenced organic radical;
m is at least zero;
n is at least one;
x is between two and six;
$f^1$ is a hydroxyl, a primary amine group, a secondary amine group or a tertiary amine group; and
O, H, C, S, and N have their normal meaning of oxygen, hydrogen, carbon, sulfur and nitrogen.

In yet another embodiment, the poly(thioesters) have the formula:

wherein
A is $—((CH_2)_2—S_x—(CH_2)_2—O—)_m(CH_2)_2—S_x—(CH_2)_2—$;
B is $—C(O)—R^1—C(O)—$;
$R^1$ is any bi-valenced organic radical;
m is at least zero;
n is at least one;
x is between two and six;
$R^3$ is $R^1$-$f^2$, HN—$R^1$-$f^3$, or HN—$R^4$—NCO,
    wherein
        $f^2$ is a chemical structure or functional group;
        $f^3$ is a chemical structure of functional group; and
        $R^4$ is a radical that is located between two isocyanate groups of a di- or poly-isocyanate; and
O, H, C, S, and N have their normal meaning of oxygen, hydrogen, carbon, sulfur and nitrogen.

In an additional embodiment, the poly(thioesters) have the formula:

wherein
A is $—((CH_2)_2—S_x—(CH_2)_2—O—)_m—(CH_2)_2—S_x—(CH_2)_2—$;
B is $—C(O)—R^1—C(O)—$;
$R^1$ is any bi-valenced organic radical;
m is at least zero;
n is at least one;
x is between two and six;
$R^5$ is $H[O—CH_2—CHR^3]_{q-k}$ or $[O—CHR^3]_{q-k}$;
$R^6$ is $[O—CHR^3—CH_2]_q$ or $[O—CHR^3]_k$;
if $R^5$ is $H[O—CH_2—CHR^3]_{q-k}$, then $R^6$ is $[O—CHR^3—CH_2]_q$;
if $R^5$ is $[O—CHR^3]_{q-k}$, then $R^6$ is $[O—CHR^3]_k$;
$R^3$ is either H or methyl;
q is at least one;
q is greater than or equal to k;
and O, H, C, S, and N have their normal meaning of oxygen, hydrogen, carbon, sulfur and nitrogen.

In an embodiment, the present invention further provides novel monomeric diesters. The new monomeric diesters are produced from di(hydroxyethyl)polysulfides and various monobasic carbonic acids or their anhydrides. The monomeric diesters have use as components in many compositions, including but not limited to solvents and plasticizers.

Monomeric diesters according to the present invention have the formula:

$$R^7—C(O)—O—X—O—C(O)—R^7$$

wherein $X=\!\!=\!\!-(-(CH_2)_2-S_x-(CH_2)_2-O-)_m-(CH_2)_2-S_x-(CH_2)_2-$;

$R^7$ is either H, or any monovalent organic radical;

each $R^7$ is either the same or different;

m is at least zero;

x is at least one; and

O, H, C, and S have their normal meaning of oxygen, hydrogen, carbon, and sulfur.

BRIEF DESCRIPTION OF THE FIGURES

The present invention together with its objectives and advantages will be understood by reading the following description in conjunction with the drawings, in which.

DESCRIPTION OF THE SPECIFIC EMBODIMENTS

In accordance with the subject invention, compositions are produced using a combination of a polysulfide-containing diol and a dibasic carboxylic acid. The products have polysulfide and ester linkages in their backbone. Each of the molecules will have at least one unit that includes one oxy group, one carbonyl group, one organic ester group, a polysulfide group, and will have at least 5, usually at least 6 carbon atoms, more usually at least 8 carbon atoms and not more than about 80 carbon atoms, usually not more than about 60 carbon atoms, more usually not more than about 46 carbon atoms. The sulfur atoms will be at least about 2 carbon atoms from an oxygen atom.

Products comprising the units can be prepared by combining the two reactants, desirably in the presence of acid, at an elevated temperature and removing water as formed. Depending on the conditions, products may be prepared using about 1:1 mole ratios of reactants and having predominantly hydroxyl and carboxyl groups at the termini, where the products are homopolymers or oligomers generally having more than about two units and having molecular weights of 5000 dal or more, or using mole ratios between greater than 1:1 and 1:2 and having predominantly terminal hydroxyl groups or carboxyl groups. As indicated above, by using special conditions or large excesses of one of the reactants a more homogeneous composition may be obtained where the ratio of the reactants is 1:2 and has a defined composition.

In referring to a homopolymer or homopolymers, it is intended that the combination of one di(hydroxysubstituted organic group) and one dibasic acid form a repetitive unit and the molecules will have both hydroxyl and carboxyl termini. An "extended monomeric" unit will have a ratio between greater than 1:1 and up to 1:2 of the two reactants, so that there will be a majority of terminal groups of the same functionality, where extended monomeric unit molecules can be employed as monomers. Particularly with co-polymers, the extended monomer will be preferred to correspond to monomers having a plurality of the same functionality.

Each product includes a monomer unit with the following formula:

$$—ORS_nR^1OA-\text{ or }—OAOR^1S_nR—$$

wherein:

O and S have their normal meaning of oxygen and sulfur;

n is at least 2 and not more than about 8, usually not more than about 4, generally ranging from 2-4, more usually from 2-3;

R and $R^1$ are the same or different and are organic divalent radicals, usually aliphatic and more usually hydrocarbon, saturated or unsaturated, straight or branched chain, generally R and $R^1$ having from 2 to 20, more usually 2 to 12 carbon atoms, wherein the total number of carbon atoms for R and $R^1$ will be in the range of about 4 to 40, usually 4 to 24 carbon atoms; and A is the residue of an organic dibasic carboxylic acid (lacking the two hydroxyl oxygens set forth in the formula) having from at least one carbon atom and not more than about 60 carbon atoms, generally from about 2 to 60, more usually about 2 to 40, frequently about 2 to 12, and conveniently about 2 to 6 carbon atoms, for acids formed by other than dimerization of two monobasic carboxylic acids and from about 24 to 40 carbon atoms for fatty acid dimers.

Where the composition is formed from the reactants in a mole ratio of its reactants of between about 1:1 and up to and including 2:1 or even greater, and has molecular weight below about 5000 dal, it is referred to as "extended monomer;" the extended monomer will have one of the following formulae:

$$MF_mORS_nR^1OM^1; \text{ or} \qquad (a)$$

$$MZAORS_nR^1F^1{}_mOAZ^1M^1, \qquad (b)$$

wherein

O and S have their normal meaning of oxygen and sulfur;

n is at least 2 and not more than about 8, usually in the range of about 2 to 4, more usually in the range of 2 to 3;

F is of the formula $—ORS_nR^1OA-$;

$F^1$ is of the formula $—OAORS_nR^1—$;

m is at least 1;

Z and $Z^1$ are oxy or amino;

M and $M^1$ are the same or different and are hydrogen when only a dibasic acid and a di(hydroxysubstituted organic group)polysulfide are reacted, or an organic substituent bonded to oxygen to form an ether or ester as appropriate or nitrogen to form a substituted amino or amide, when with a single group it is referred to as an "augmented extended monomer;" and the remaining symbols are as defined previously.

The extended monomers and augmented monomers can be used to form homo- or copolymers (of the extended monomers, only the hydroxyl terminal extended monomers can be used to form homopolymers).

R and $R^1$ may be ethylene, propylene, isopropylene, butylene, hexylene, hexenylene, butynylene, etc.

Preferred polysulfide diol compounds are aliphatic, where R and $R^1$ are dialkylene of from 2-12, usually 2 to 6 carbon atoms, particularly polymethylene, or methyl or ethyl substituted polymethylene. Preferably, the hydroxyl group is from 2 to 3 carbon atoms from the polysulfide group.

Examples of A include carbonyl dioyl, (carbonic acid; particularly when in a 1:2 mole ratio to the diol) oxaldioyl, malondioyl, succindioyl, pimeldioyl, adipdioyl, sebacdioyl, maledioyl, phthaldiolyl, terephthaldioyl, dimers of fatty acids (particularly fatty acids of from 16 to 18 carbon atoms), oxy(bis-acetyl), N-methyl amino(bis-propionyl), 1,4-cyclohexane diacetyl, etc. Preferred A groups are aliphatic, may be saturated or unsaturated, straight chain or branched and may have 0 to 2 heteroatoms, such as oxygen, nitrogen and sulfur.

Z and $Z^1$ are the same or different and will be for the most part oxy or —NH—, but may be a substituted amino having an alkyl group of from 1 to 6, usually 1 to 2 carbon atoms.

When M and $M^1$ are other than hydrogen, that is, define the "augmented extended monomer," then M is defined as $W^1R^2$—; and
$M^1$ is defined as $W^2R^3$—, wherein:

$R^2$ and $R^3$ are the same or different and organic divalent radicals, normally terminating in carbon atoms, of 1 to 20 carbon atoms, usually 2 to 12 carbon atoms, which may be aliphatic, alicyclic, aromatic, heterocyclic (usually having from 1-3, more usually 1-2, annular heteroatoms, that are oxygen, nitrogen and sulfur) or combinations thereof, usually aliphatic, substituted or unsubstituted, straight or branched chain, aliphatically saturated or unsaturated, usually having no more than three, more usually no more than two sites of aliphatic unsaturation, e.g. double or triple bond, conjugated or unconjugated, where substituents not participating in the reaction to form the augmented monomer will be inert to the reactions of preparation of the augmented monomers and may be inert to the polymerization reactions, being organic or inorganic substitutions, containing heteroatoms such as oxygen, nitrogen, sulfur, phosphorous, silicon, boron, etc., comprising such groups as oxy (ether), thio (usually ether), cyano, amino and substituted amino, I°, II°, III° and IV°, halo, azo, etc., oxo-carbonyl (keto, aldehyde), non-oxo-carbonyl (carboxylic acid, ester and amide) phosphoryl, phosphonyl, silicyl, boronyl, etc., there usually being not more than about 4 heterosubstituents, more usually not more than about 2 heterosubstituents, generally having from 2 to 12, more usually 2 to 6 carbon atoms, and from 0 to 8, more usually 0 to 6, generally 0 to 4 heteroatoms; generally being aliphatic of from 2 to 6 carbon atoms, particularly polymethylene or methyl or ethyl substituted polymethylene; and W and $W^1$ are the same or different, usually the same, and are amino, including primary and secondary amino of from about 1 to 6, usually about 1 to 4 carbon atoms, hydroxyl, carboxyl, isothiocyanate, isocyanate, oxo-carbonyl, non-oxy-carbonyl, siloxane, silane, cyclocarbonate, active olefin, e.g. acrylyl, methacrylyl, allyl, vinyl, e.g. vinyl ether, active halo, and the like.

Compounds that can be used to further augment the size of the extended monomers include diamines, such as propylene diamine, N-methyl butylenediamine, N-aminoethylpiperazine, 1,1-dimethyl-1,4-diaminobutane, trimethylhexamethylenediamine, 2-methylpentamethylenediamine, aziridine, oxirane, glycidyl alcohol, diols, such as diethylene glycol, tripropylene glycol, catechol, hydroquinone, various dihydroxyalkyl polysulfides, glycolic, acrylic and methacrylic acids, hydroxyethyl acrylate and methacrylate, N-hydroxypropyl acrylamide, di(hydroxybutyl)diethyl siloxane, allyl alcohol, glycerol carbonate, chloroacetic acid, acrylic acid, dihydroxyacetone, 4,4-di(hydroxymethyl)butyric acid, etc.

The extended monomers and the polymers of the basic unit of the polysulfide diol and dibasic acid may be prepared by combining the two reactants in the appropriate mole ratio, depending upon which monomer is desired and whether terminal hydroxyl or terminal carboxyl groups are desired. The polysulfide diol and diacid or anhydride are combined in the appropriate ratio, conveniently in the absence of a solvent and in the presence of an acid catalyst, and heated to an elevated temperature above about 90° C., generally in the range of about 100 to 180° C., while removing the water from the reaction mixture. Water can be removed conveniently by employing a mild vacuum, from about 1-20 mm Hg. Any convenient acid catalyst may be employed, although it is found that for some combinations, one catalyst is preferred over another. For the most part, sulphonic acid catalysts find use, particularly methane sulfonic acid, although p-toluene sulphonic acid may also be used. Other catalysts include zeolites, Lewis acids, acidic diatomaceous earths, etc. The amount of catalyst will generally be in the range of about 0.01 to 2 wt % of the reactants. In some instances, mixtures of the diol may be employed, where the polysulfide may be a mixture of polysulfides having differing numbers of sulfurs. For example, the commercially available DiHEDS (Chevron Phillips Chemical Company LP, regular grade) comprises 95-97% di(hydroxyethyl)disulfide and 3-5% of higher polysulfides, mainly the trisulfide.

The high molecular weight poly(thioesters) have the formula:

$$Xf_mOX^1$$

wherein:
f is the group —$ORS_nR^1OA$-;
X is H or HOA-;
$X^1$ is H or —$RS_nR^1OH$;
m is in the range of about 2 to 100, usually in the range of about 2 to 60, more usually in the range of about 4 to 50; and
the remaining symbols are as defined previously.

These polymers can be produced when the molar ratio between dibasic acid and a di(hydroxysubstituted organic group)polysulfide is close to 1:1, or equals 1:1.

The subject monomers may be reacted with difunctional compounds having the same or different functionalities, where the difunctional compounds will generally be of at least about 2 carbon atoms, usually when a monomer of from about 2 to 12, more usually 2 to 6 carbon atoms and usually having only two reactive functionalities, although up to 4 reactive functionalities may be present if one wishes to have cross-linking, or 1000 or more carbon atoms, usually not more than about 500 carbon atoms when one wishes prepolymers. Common reagents include glycolic acid, where a terminal hydroxyl may be exchanged for a carboxyl functionality or a terminal carboxyl functionality may be extended retaining the carboxyl functionality. Therefore, by appropriate choice, one may vary the terminal functionalities depending upon the comonomer that one wishes to use for the copolymerization. Functionalities for reacting with the monomer may include active halogen, hydroxyl, and carboxy, while the terminal functionality may include active halogen, non-oxo- and oxo-carbonyl, hydroxyl, amino, e.g. primary and secondary, silyl, siloxanyl, etc. For cross-linking, combinations of hydroxyl, carboxyl, amino, etc. functionalities may be employed, having at least about 3 and not more than about 5 reactive functionalities.

The polymers of the extended monomers and augmented monomers may be generally depicted with the following formula:

$$T(ED)_rT^1$$

wherein:
T and $T^1$ are the same or different and are the terminal groups of the polymer derived from one of the comonomers;
one of E and D is a subject extended and/or augmented monomeric unit, and the other is the comonomer; and
r will be at least 2, generally on the average at least about 5 and usually not more than about 1000, more usually not more than about 500, generally not more than about 100.

The polymers that are prepared will have at least one extended and/or extended augmented monomeric unit, generally at least two of such units, and may have 500 or more of such units, depending upon the nature of the polymer. One group of polymers of particular interest are polymers that have from about 2 to 100, more usually about 5 to 50 total monomeric units, coming from both the subject extended monomers and the comonomers. The same or different subject extended monomers may be used and the polymers may include block copolymers, alternating copolymers, cross-linked copolymers, etc. The comonomer may be a small di- or higher functionality molecule of less than about 500 dal, may be an oligomer of 2 or more units, usually not more than about 100 units, or any other organization of monomers to provide the second member of the copolymer. As indicated above, one may have a condensation polymer where the subject monomers are in the backbone of the polymer or may be joined to a monomer that can undergo addition polymerization, where the subject monomer would be a side chain or a cross-linker for the polymer.

A variety of second monomers can be employed to provide the polymeric products of this invention. One important group of compounds is polyisocyanates to form polyurethanes. Illustrative polyisocyanates include 2,4- and 2,6-toluene diisocyanate, isophorone diisocyanate, trimethylhexamethyleneisocyanate, 3,3'-dimethoxy-4,4'-biphenylene diisocyanate, naphthalene-1,5-diisocyanate, hexamethylene diisocyanate, 1,4-phenylene diisocyanate, etc. Illustrative patents concerning diisocyanates are U.S. Pat. Nos. 4,032,468; 5,043,398 and 5,098,788 and the references cited therein, are specifically incorporated herein by reference and are only illustrative of the large patent literature concerning the use of polyisocyanates with a wide variety of comonomers for a diverse group of utilities.

The polyurethanes can be prepared from hydroxy-terminated extended monomers by their reaction with polyisocyanates, and from isocyanate-augmented expended monomers by the reactions with conventional polyol and polyamine chain extenders and crosslinkers in accordance with conventional ways as described in the references cited above and other references present in the literature. Generally, the reaction takes place at temperatures in the range of about 20 to 150° C. in the presence of typical catalysts of an isocyanate reaction, which are known to persons skilled in the art. The ratio of NCO to OH should be chosen depending on the targeted properties of the produced material: if the goal is to produce a hard polyurethane plastic, or polyurethane elastomer, the NCO/OH ratio should be close to 1:1. If the goal is to produce a curable reactive resin or prepolymer, the ratio should be higher. The time of the reaction will vary depending upon the nature of the reactants, generally not exceeding several hours.

Also important are products generated when the carboxyl and hydroxyl-terminated extended monomers and augmented monomers are polymerized through the reactions of polyetherification, polyesterification and polyamidation, where the hydroxyl or carboxyl groups of the monomer may react with amine or hydroxyl groups of a polyfunctional co-reactant, forming a polymer with amide, ether and ester links. In this way, polymers can be prepared having a variety of physical and chemical properties. The comonomers in these reactions are polyamines, polyethers or combinations thereof, where the comonomers may be di- or higher order, being aliphatic, alicyclic, aromatic or combinations thereof, substituted or unsubstituted, the substituents normally being inert in the polymerization, such as ethers, esters, amides, cyano, stable halo, e.g. bonded to an annular aromatic carbon, etc., or may be heterocyclopropanes, i.e. aziridine, oxirane and substituted derivatives thereof, where the substituent will usually be alkyl. Thus, comonomers may be exemplified by ethylene glycol, propylene glycol, polyethylene glycol, di(hydroxyethyl)amine, di(aminoethyl)ether, N-methyl di(aminoethyl)ether, di(hydroxyethyl)sulfide or disulfide, hydroquinone, catechol, 1,4-diaminocyclohexane, 1,4-phenylenediamine, etc. The comonomers will have from about 2 to 20, more usually from about 2 to 12 carbon atoms and from 2 to 7, usually 2 to 5 heteroatoms, which will for the most part be N, S and O.

Instead of the condensation polymers described above, the subject monomers may be modified to be used in addition polymers. By modifying a hydroxyl or carboxyl group to add an addition polymerizable olefinic group, one can provide products that can serve as addition polymerizable monomers where only one olefinic group is added or as cross-linking agents, where two olefinic groups are added. In the latter case, by copolymerizing with a different addition polymerizable monomer, one can provide a polymer that is reversibly cross-linked. By reducing a disulfide linkage, the cross-linking will be cleaved, while with oxidation the disulfide will be restored and the cross-link reestablished.

Any convenient addition polymerizable compound can be employed that will react with a hydroxyl group or carboxyl group of the subject extended monomers and with the same functionalities as well as amino groups of the subject augmented monomers. Thus any active ethylene group that has an available hydroxyl, carboxyl or amino group for reaction can be employed. For example, the acrylic acids, hydroxysubstituted active ethylene groups, e.g. hydroxyethoxyethylene, aminoethoxyethylene, aminoethyl acrylate, hydroxyethyl acrylamide, etc. Common addition polymerizable monomers useful as comonomers include the acrylic acids, such as acrylic acid, methacrylic acid, α-chloroacrylic acid, ethyl acrylate, acrylamide, etc., vinyl compounds, such as hydroxyethyl vinyl ether, carboxyethyl vinyl ether, vinyl glycolate, allyl alcohol, etc., and polyenes, such as 2-hydroxymethyl butadiene, carboxymethyl butadiene, p-carboxystyrene, etc.

The polymers may be formulated in conventional ways. Common additives include plasticizers, extenders, UV absorbers, stabilizers, release agents, etc. These additives are used based on the nature of the polymer in conventional amounts or reduced amounts based on the properties provided by the subject monomers.

These compounds will be prepared in accordance with conventional ways, where esters can be prepared with carbodiimides, mixed anhydrides, or acid, as appropriate, with removal of water, and the like, under mild conditions, by combining the reactants in the appropriate mole ratio. The addition polymers may be polymerized under conventional conditions that are compatible with the presence of a polysulfide. Acid, metal ion or actinic radiation, optionally in conjunction with a photoinitiator, catalysis can find use. See, for example, U.S. Pat. No. 4,131,716.

While the above described polymers are the most common polymers, the subject monomers can also find use with such polymers as polyacetals, polyphosphate esters, alkyd polymers, polydienes, poly fatty acids, and the like.

The subject monomers can impart a large number of advantageous properties to the polymers employing the monomers. The subject monomers can enhance flexibility, low temperature properties, hydrophobicity, non-polar organic solvent resistance, affinity to metal surfaces, even rusty metal surfaces, weatherability, including ozone resistance, gas impermeability, resistance to UV radiation, mechanical properties and abrasion resistance, particularly in conjunction with polyisocyanate comonomers.

Due to the compatibility of the subject monomers, they can find use in polymers used as adhesives, sealants, coatings, elastomers, plastic formulations, molded products, fibers, hot melt adhesives, as additives and modifiers and independently as precursors to other reactive compounds. A variety of physical objects can be made having varying characteristics and properties from the polymers, using the subject polymers by themselves or in combination with other compatible polymers.

Embodiments of Poly(Thioesters)

In an embodiment, the present invention provides poly(thioesters) of the formula:

wherein
$R^2$ is H;
A is either X or Y,
    wherein X is $-(-(CH_2)_2-S_x-(CH_2)_2-O-)_m-(CH_2)_2-S_x-(CH_2)_2-$,
    Y is $-C(O)-R^1-C(O)-$,
    $R^1$ is any bivalenced radical,
    m is at least zero, and
    x is between two and six;
B is either Y or X;
O, H, C, and S have their normal meaning of oxygen, hydrogen, carbon, and sulfur;
if A is X, then B is Y;
if A is Y, then B is X; and
n is at least one, except for the case when A is Y, B is X, and $R^1$ is a dibasic carbonic acid that is a cyclic anhydride or forms a cyclic anhydride, in which case n is at least two.

Poly(thioesters) according to the present invention are made from reacting two main components. The first component includes di(hydroxyethyl)polysulfides, homopolymers of di(hydroxyethyl polysulfides), or a mixture of di(hydroxyethyl)polysulfides and homopolymers of di(hydroxyethyl)polysulfides. The second component includes dibasic carbonic acids and their anhydrides, or mixtures of dibasic carbonic acids and their anhydrides. The two components are reacted in the presence of a protonic acidic catalyst at a temperature of between about 80° C. and about 130° C.

Any type of protonic acidic catalyst may be used according to the present invention. Preferably, the acidic catalyst is a nonoxidizing protonic acidic catalyst. More preferably, the acidic catalyst is methanesulphonic acid. When methanesulphonic acid is used as the catalyst, the two components may be reacted at a temperature of between about 80° C. and about 180° C.

Any di(hydroxyethyl)polysulfides (or homopolymers thereof) may be used according to the present invention. Preferably, the di(hydroxyethyl)polysulfide is a di(hydroxyethyl)disulfide, a di(hydroxyethyl)trisulfide, or a di(hydroxyethyl)tetrasulfide.

Any dibasic carbonic acid or its anhydride may be used according to the present invention. Preferred dibasic carbonic acids are $C_2$ to $C_{40}$ saturated and unsaturated acids, substituted and unsubstituted carboxylic diacids and their anhydrides. Examples include, but are not limited to, fatty acid dimers, malonic, succinic, glutaric, adipic, pimelic, suberic, azelaic, sebacic, maleic, fumaric, phthalic, isophthalic, terephthalic, hemimellitic, trimellitic, trimesic, nonane-di-carbonic, decane-di-carbonic, brassylic, dithiodiacetic, dithiodipropionic, and dithiodibutyric acids and their anhydrides. In addition, mixtures of dibasic carbonic acids or their anhydrides may be used to make poly(thioesters) according to the present invention. Though the chemical reactions shown below illustrate the interaction between di(hydroxyethyl)polysulfides and dibasic carbonic acids, any person skilled in the art can understand that similar reactions can occur when the anhydrides of dibasic carbonic acids are taken in the place of the acids themselves.

The structure, molecular weight and other properties of poly(thioesters) can be varied by a person skilled in the art within a wide range of parameters to achieve targeted properties of the final polymer. The mechanisms that allow such a variation in properties include selecting a dibasic carbonic acid with a particular structure, and properly choosing its molar ratio with di(hydroxyethyl)polysulfide or its homopolymer. These mechanisms make it possible to obtain both carboxyl- and hydroxyl-terminated poly(thioesters) with different pre-regulated lengths of polymeric chain, as well as high molecular weight poly(thioester) polymers. In particular, varying the structure of the carboxyl-carrying participants in the reaction, and the molar ratio of the reactants, allows producing poly(thioesters) with the
    desired type of termination (carboxyl- and hydroxyl-terminated compounds),
    desired structure of repetitive polymeric segment, and
    desired number of such segments per molecule, i.e. molecular weight of the product.

Varying the molar ratio of components between 1:1 and 2:1 allows the production of poly(thioesters) containing the desired number of polysulfide segments and ester groups. If the molar ratio of reactants is close to 2:1, low molecular weight or oligomeric compounds are produced. If the molar ratio of reactants is close to 1:1, high molecular weight thermoplastic poly(thioesters) are produced.

Carboxyl-terminated poly(thioesters) are produced from di(hydroxyethyl)polysulfides and dibasic carbonic acids according to reaction (2), when the molar concentration of the carboxyl group in the reaction mixture is higher than the molar concentration of the hydroxyl group.

where A=$-C(O)-R^1-C(O)-$
B=$-((CH_2)_2-S_x-(CH_2)_2-O-)_m-(CH_2)_2-S_x-(CH_2)_2$
$m \geq 0$
$1 \leq n \leq 25$.

Hydroxyl-terminated poly(thioesters) are produced according to the reaction (2),
where A=$-((CH_2)_2-S_x-(CH_2)_2-O-)_m-(CH_2)_2-S_x-(CH_2)_2-$, and
B=$-C(O)-R^1-C(O)-$.

High molecular weight poly(thioesters) are produced when the molar concentration of the hydroxyl group in the reaction mixture approximately equals the molar concentration of the carboxyl group, i.e. when in the reaction (2) n>25. In the case of high molecular weight poly(thioesters), if one component is taken in slight excess, its termination will be prevailing. High-molecular weight poly(thioesters) are thermoplastic materials that can be formed by extrusion, injection or compression molding or other similar techniques.

Poly(thioesters) according to the present invention can be used as the basis of many different compositions. Low molecular weight, or oligomeric compounds can be used as components in various adhesive, sealant, caulk, coating, paint, elastomer or other compositions. The carboxyl-terminated poly(thioester) oligomers can be chain extended and crosslinked, for example, by polyaziridines, epoxies and inorganic salts, oxides and hydroxides. The action of di- and/or polyisocyanates will convert oligomeric hydroxy-terminated poly(thioesters) into solid polyurethanes with a poly(thioester) backbones.

High molecular weight thermoplastic poly(thioesters) can be used for the production of flexible plastics, or used as an additive, which imparts targeted properties on such materials as polyethylene terephthalate, and cured unsaturated polyesters, vinyl esters, or other similar plastics.

Products Derived from Carboxyl-Terminated poly(thioesters)

Carboxyl-terminated poly(thioesters) can further react with hydroxyl-containing substances using an esterification mechanism to form compounds of the formula:

$$R^2-[-O-A-O-B-]_n-O-A-O-R^2$$

wherein
each $R^2$ is $R^1$-f,
wherein $R^1$ is any bi-valenced organic radical, and f is H or any reactive functional group;
each $R^2$ is the same or different;
A is $-C(O)-R^1-C(O)-$;
B is $-(-(CH_2)_2-S_x-(CH_2)_2-O-)_m(CH_2)_2-S_x-(CH_2)_2-$;
wherein
m is at least zero;
x is between two and six; and
O, H, C, and S have their normal meaning of oxygen, hydrogen, carbon, and sulfur.

The esterification mechanism takes place in typical conditions for such reactions, familiar to any person skilled in the art. Reaction (3) describes such reactions $$f\text{-}R^1-OH+H[-O\text{-}A\text{-}O-B-]_n-O\text{-}A\text{-}OH+HO-R^1\text{-}f \rightarrow f\text{-}R^1-[-O\text{-}A\text{-}O-B-]_n-O\text{-}A\text{-}O-R^1\text{-}f+2H_2O \quad (3)$$

where f is a chemical structure or functional group that introduces special properties and characteristics, allowing further utilization of the newly produced compound. The structure of f includes, but is not limited to hydroxyl, acrylic, methacrylic, allyl, vinyl, maleic, activated halogen, nitrile, cyclocarbonate, mercaptan and tertiary amine groups.

Examples of carriers of various f functionalities include:
For hydroxyl functionality—any diol, polyol, or organic oxide;
For acrylic functionality—hydroxy acrylate;
For methacrylic functionality—hydroxy methacrylate;
For allyl and vinyl functionalities—any compound containing both a hydroxyl group and an allyl or vinyl group, such as monovinyl ether of diethyleneglycol;
For cyclocarbonate functionality—glycerol carbonate;
For amine functionality —N,N'-dialkylethanolamine;
For activated halogen functionality—a monoester of any glycol and chloroacetic acid;
For maleic double bond functionality—maleic anhydride;
For nitrile functionality—ethylenecyanohydrin; and
For mercaptan functionality—mercaptoethanol.

One important example of reaction (3) is when f is another hydroxyl group. Carboxyl-terminated poly(thioesters) can react with an individual polyol, or mixture of polyols, forming, depending on the poly(thioester)/polyols molar ratio, a blocked polymer, which includes poly(thioester) and polyether blocks. The molecular weight of the final product, and the proportion of the polyester/polyether segments in it can be pre-determined by the molar ratio of the reactive component. For example, if one takes 2 moles of component A and one mole of component B, the resulting product will mostly contain molecules with molecular weight equaled to twice the molecular weight of A plus one molecular weight of B. This is the lowest molecular weight product obtained by polycondensation (in this case it is not "polycondensation", but plain condensation). In contrast, if one takes 1 mole of A and 1 mole of B, one would theoretically get one polymeric molecule with molecular weight approaching infinity. Any ratio between 1:1 and 2:1 will result in a product with a definite molecular weight, so that a person skilled in art can, by choosing the ratio of components, choose the molecular weight of the final product. It must be noted that if one of the polyols that participates in this process has functionality higher than 2, the resulting products have a degree of branching, which is pre-determined by the molar amount of the high functionality polyol.

The products of reaction (3) with compounds other than polyols can also be used in various reactive formulations cured by the radical mechanism in the cases of acrylic, methacrylic, allyl and vinyl-terminated substances, by the action of air moisture in the cases of alkoxysilane-terminated substances, by diamines in the case of cyclocarbonate-terminated materials, and by the anionic mechanism in the case of tertiary amine-terminated materials.

Carboxyl-terminated polythioesters can further react with any compound with amine group(s) through an amidation mechanism to form compounds of the formula:

$$f^1\text{-}R^1-NH\text{-}A\text{-}O-B-[-O\text{-}A\text{-}O-B-]_n-O\text{-}A\text{-}HN-R^1\text{-}f^1$$

wherein
A is $-C(O)-R^1-C(O)-$;
B is $-((CH_2)_2-S_x-(CH_2)_2-O-)_m-(CH_2)-S_x-(CH_2)_2-$;
$R^1$ is any bi-valenced organic radical;
m is at least zero;
n is at least one;
x is between two and six;
$f^1$ is a hydroxyl, a primary amine group, a secondary amine group or a tertiary amine group; and
O, H, C, S, and N have their normal meaning of oxygen, hydrogen, carbon, sulfur and nitrogen.

The amidation reactions take place in typical conditions for such reactions, familiar to any person skilled in the art. Reaction (4) describes such reactions.

$$f^1\text{-}R^1-NH_2+H[-O\text{-}A\text{-}O-B-]_n-O\text{-}A\text{-}OH+H_2N-R^1\text{-}f^1 \rightarrow f^1\text{-}R^1-NH\text{-}A\text{-}O-B-[-O\text{-}A\text{-}O-B-]_{n-1}-O\text{-}A\text{-}HN-R^1\text{-}f^1+2H_2O \quad (4)$$

where $f^1$ is a hydroxyl, or a primary, secondary or tertiary amine group.

An important example of reaction (4) is when $f^1$ is a primary or secondary amine group. Carboxyl-terminated poly(thioesters) can react with diamines, forming, depending on the poly(thioester)/diamine molar ratio, either amidoamine, or polyamide with poly(thioester) segments. If an amidoamine is desired, in order to generate a product with the least amount of undesirable byproducts, it is beneficial to react the carboxyl-terminated poly(thioester) with a diamine that has unequal reactivity of amine groups, i.e. either has one primary and one secondary amine group, such as in N-aminoethyl piperazine, or one sterically hindered amine group, such as trimethylhexamethylenediamine, 2-methylpentamethylenediamine, 1,3-pentanediamine and isophorone diamine. On the other hand, if the goal of the technological process is to produce polyamide with poly(thioester) segments, it is better to use in reaction (4) a diamine with two primary amine groups with equal reactivity.

Amidoamines produced as the result of reaction (4) can be used as is, or in a mixture with other products, for example as curing agents for epoxy coatings and adhesives formulations.

Products Derived from Hydroxyl-Terminated Poly (Thioesters)

Hydroxyl-terminated poly(thioesters) can further react with any compound typically reactive with hydroxyl groups, providing compounds with new types of functionalities. These reactions can utilize an esterification mechanism following reaction (5), an etherification mechanism following reactions (6), (7) or (8), or an isocyanate mechanism following reactions (9) or (10).

Hydroxyl-terminated poly(thioesters) can react using an esterification mechanism to form compounds of the formula:

wherein
A is —((CH$_2$)$_2$—S$_x$—(CH$_2$)$_2$—O—)$_m$—(CH$_2$)$_2$—S$_x$—(CH$_2$)$_2$—;
B is —C(O)—R$^1$—C(O)—;
R$^1$ is any bi-valenced organic radical;
m is at least zero;
n is at least one;
x is between two and six;
f$^2$ is a chemical structure or functional group; and
O, H, C, and S, have their normal meaning of oxygen, hydrogen, carbon, and sulfur.

The esterification reaction takes place in typical conditions for such reactions, familiar to any person skilled in the art, and is described in reaction (5).

where f$^2$ is a chemical structure or functional group that introduces special properties and characteristics, allowing further utilization of the newly produced compound. The structure of f$^2$ includes, but is not limited to hydroxyl, carboxyl, acrylic, methacrylic, allyl, vinyl, maleic, activated halogen, nitrile, cyclocarbonate, and mercaptan.

Examples of carriers of various f$^2$ functionalities include:
For carboxyl functionality—any bi-functional carbonic acids, for example, maleic or succinic acids, or dimers of fatty acids;
For hydroxyl functionality—any compound that has both a hydroxyl and carboxyl group, for example, glycolic acid;
For acrylic functionality—acrylic acid;
For methacrylic functionality—methacrylic acid;
For active halogen functionality—chloroacetic acid, or its analogs;
For allyl, vinyl and other double bond functionalities—any unsaturated carbonic acid;
For maleic double bond functionality—maleic acid;
For nitrile functionality—monoesters of any dicarbonic acid and ethylenecyanohydrin; and
For mercaptan functionality—mercaptopropyonic acid.

The case where f$^2$ is a carboxyl (i.e. the first reagent in reaction (5) is a dibasic carbonic acid, which can be either the same or different from the dibasic carbonic acid used in the production of the second reagent in reaction (5)) is of special interest. Introduction of a dibasic acid as a second reagent in reaction (5) allows changing the molecular weight of the produced polymer by choosing the structure of R$^1$ and molar ratio of the participants in reaction (5). Any person skilled in the art will recognize that it is possible to produce similar reaction products if, instead of dibasic carbonic acids, the second reagent in reaction (5) is anhydrides of such acids.

The produced polyesters with poly(thioester) blocks can be used as such, or as additives to other plastics. In the case when the hydroxyl-terminated poly(thioesters) react with maleic acid, the produced segmented unsaturated polysulfide-containing polyester can be cured by all the conventional methods of curing of unsaturated polyesters, and used as a copolymerizable additive to the conventional unsaturated polyesters.

The special properties of hydroxyl groups located in the β-position to the disulfide group, as taught by the U.S. Pat. No. 2,582,605, allows them to easily participate in the reactions of etherification with other alcohols, glycols and polyols, to form compounds of the formula:

wherein
each R$^2$ is R$^1$-f,
wherein R$^1$ is any bi-valenced organic radical, and
f is H or any reactive functional group;
each R$^2$ is the same or different;
A is —(—(CH$_2$)$_2$—S$_x$—(CH$_2$)$_2$—O—)$_m$—(CH$_2$)$_2$—S$_x$—(CH$_2$)$_2$—;
B is —C(O)—R$^1$—C(O)—;
wherein
m is at least zero;
x is between two and six; and
O, H, C, and S have their normal meaning of oxygen, hydrogen, carbon, and sulfur.

The etherification reaction takes place in typical conditions for such reactions, familiar to any person skilled in the art, and is described in reaction (6).

where f is a chemical structure or functional group that introduces special properties and characteristics, allowing further utilization of the newly produced compound. The structure of f may be, but is not limited to hydroxyl, acrylic, methacrylic, allyl, vinyl, maleic, activated halogen, nitrile, cyclocarbonate, mercaptan and amine groups.

Examples of carriers of various f functionalities include:
For hydroxyl functionality—any diol, polyol, or organic oxide;
For acrylic functionality—hydroxy acrylate;
For methacrylic functionality—hydroxy methacrylate;
For allyl and vinyl functionalities—any compound containing both a hydroxyl group and an allyl or vinyl group, such as monovinyl ether of diethyleneglycol;
For cyclocarbonate functionality—glycerol carbonate;
For amine functionality —N,N'-dialkylethanolamine;
For activated halogen functionality—a monoester of any glycol and chloroacetic acid;
For maleic double bond functionality—maleic anhydride;
For nitrile functionality—ethylenecyanohydrin; and
For mercaptan functionality—mercaptoethanol.

The case where f is a hydroxyl is of a special interest, as it allows changing the molecular weight of the produced polymer by choosing the structure of R$^2$ and the molar ratio of the participants in the reaction (6).

Another type of etherification reaction takes place when a hydroxyl-terminated poly(thioester) is treated with either ethylene oxide, or propylene oxide, to form compounds of the formula:

wherein

A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^5$ is $[O-CH_2-CHR^3]_{q-k}$;
$R^6$ is $[O-CHR^3-CH_2]_q$;
$R^3$ is either H or methyl;
q is at least one;
q is greater than or equal to k; and
O, H, C, and S have their normal meaning of oxygen, hydrogen, carbon, and sulfur.

This etherification reaction takes place in typical conditions for such reactions, familiar to any person skilled in the art, and is described in reaction (7).

(7)

where $R^3$ is either H, or methyl,
$q \geq 1$,
$q \geq k$.

This reaction produces derivatives of poly(thioesters) that are useful, for example, in coatings formulations.

Another possible type of useful derivatives of hydroxyl-terminated poly(thioesters) can be produced by their reactions with formaldehyde to form polyacetals with a poly(thioester) backbone, as described in the following formula:

wherein

A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^5$ is $[O-CHR^3]_{q-k}$;
$R^6$ is $[O-CHR^3]_k$;
$R^3$ is either H or methyl;
q is at least one;
q is greater than or equal to k; and
O, H, C, and S have their normal meaning of oxygen, hydrogen, carbon, and sulfur.

This etherification reaction takes place in typical conditions for such reactions, familiar to any person skilled in the art, and is described in reaction (8).

(8)

The hydroxyl groups of the hydroxyl-terminated poly(thioesters) readily participate in reactions with compounds containing isocyanate groups. Of these compounds the most important and frequently used are those made from di- and polyisocyanates, of the formula:

wherein

A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^3$ is $HN-R^1-f^3$,
wherein $f^3$ is a chemical structure of functional group; and
O, H, C, S, and N have their normal meaning of oxygen, hydrogen, carbon, sulfur and nitrogen.

These compounds can be made through the isocyanate reaction shown in reaction (9). This reaction takes place in typical conditions for such reactions, familiar to any person skilled in the art.

(9)

where $f^3$ includes, but is not limited to isocyanate, epoxy, acrylic, methacrylic, alkoxysilane, mercaptan, cyclocarbonate, tertiary amine, vinyloxy, and mixtures thereof.

A very important case is when $f^3$ is another isocyanate group. Depending on the molar ratio between the hydroxyl-terminated poly(thioester) and isocyanate-containing compound, the reaction can either terminate in an isocyanate prepolymer with a poly(thioester) backbone (reaction (10)), or in a polyurethane with polythioester segments.

When hydroxyl-terminated poly(thioester) and isocyanate-containing compound are taken in the molar ratio close to 1:2, the reactions between them result in the formation of an isocyanate prepolymer of the formula:

wherein

A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^3$ is $HN-R^4-NCO$,
wherein $R^4$ is a radical that is located between two isocyanate groups of a di- or poly-isocyanate; and
O, H, C, S, and N have their normal meaning of oxygen, hydrogen, carbon, sulfur and nitrogen.

This reaction takes place in typical conditions for such reactions, familiar to any person skilled in the art and is described in reaction (10).

(10)

where $R^4$ is a bivalent radical located between two isocyanate groups of a diisocyanate, preferably of a diisocyanate with unequal reactivity of isocyanate groups, such as 2,4-toluene diisocyanate, isophorone diisocyanate, or trimethylhexamethylenediisocyanate.

The isocyanate prepolymers produced by the reaction (10) can be
a) converted into polyurethanes with poly(thioester) blocks by reactions with a diol chain extender, and polyol crosslinkers;
b) converted into poly(urea-urethanes) with poly(thioester) blocks by reactions with aromatic diamine chain extenders and crosslinkers;
c) converted into reactive and non-reactive functional oligomers with poly(thioester) backbones by the methods described in the U.S. Pat. No. 6,369,188. The functionality of the produced urethane-functional polysulfide-containing compounds includes, but is not limited to epoxy, acrylic, methacrylic, alkoxysilane, mercaptan, cyclocarbonate, tertiary amine, vinyloxy, and mixtures thereof.

When hydroxyl-terminated poly(thioester) and isocyanate-containing compound are taken in close-to-equimolar amounts, the reactions between them result in the formation of a polyurethane with polythioester segments. These polyurethanes have improved properties due to the presence of polysulfide blocks.

Production of Monomeric (Polythio)Diesters

The present invention also provides monomeric (polythio) diesters of the formula:

$$R^7—C(O)—O—X—O—C(O)—R^7$$

wherein $X = —(—(CH_2)_2—S_x—(CH_2)_2—O—)_m—(CH_2)_2—S_x—(CH_2)_2—$; 
$R^7$ is either H, or any monovalent organic radical;
the two $R^7$s are either the same or different;
m is at least zero;
x is at least one; and
O, H, C, and S have their normal meaning of oxygen, hydrogen, carbon, and sulfur.

In order to produce these products, dihydroxyethylpolysulfide and/or its homopolymers react with individual monobasic carbonic acids, such as acetic, chloroacetic, propyonic, fatty, etc. acids, their anhydrides, or mixtures of such acids or anhydrides under conditions similar to those described above for dibasic acids. The (polythio)diesters are produced according to reaction (11)

$$R^7—C(O)OH + H[—O-A-O—B—]_n—O-A-OH + HO(O)C—R^7 \rightarrow R^7—C(O)[—O-A-O—B—]_n—O-A-O(O)C—R^7 \quad (11)$$

where $R^7$ is H or any monovalent organic acid. In one embodiment, $R^7$ is a monobasic carboxylic acid having between two and nineteen carbons.

The produces low viscosity polysulfide-containing diesters that are very effective solvents and plasticizers for a wide variety of polymeric products.

EXAMPLES

The following examples are offered by way of illustration and not by way of limitation.

Group A—Examples 1-7

Group A Experimental

Group A—Example 1

Production of Carboxyl-Terminated poly(thioester) from di(hydroxyethyl)disulfide and Fatty Acid Dimer 27 g of di(hydroxyethyl)disulfide (DiHEDS, produced by Chevron Phillips Chemical Company LP, Regular grade) and 200 g dimer fatty acid dimer (CAS #61788-89-4, Pripol-1013 from Uniqema, ICI Company) were combined in a jacketed reaction vessel and agitated. The molar ratio of components was 1:2. 0.2 g (0.05% of the total weight of raw materials) of p-toluenesulfonic acid monohydrate with 98% purity (CAS number 6192-52-5, obtained from Sigma-Aldrich) was used as a catalyst.

The esterification reaction proceeded at 125-130° C. (260-270° F.) for 3-4 hours with constant mixing. 10 mm Hg vacuum was applied in order to facilitate the removal of water from the reaction mixture.

For process control during this stage the concentration of carboxyl groups was monitored by ASTM D 465.

The process ended when the concentration of acid approached the calculated acid number of the carboxyl-terminated poly(dithioester), and no further distillate was formed. The acid number of the produced material equaled 83.6 mg KOH/g, while the projected acid number was 83.58. The produced material was a dark brown liquid with 6000 cPs viscosity.

Group A, Example 2

Production of hydroxyl-terminated poly(thioester) from di(hydroxyethyl)disulfide and succinic anhydride 308 g Di(hydroxyethyl)disulfide (DiHEDS CP Chem L.L.C., Water-free grade) and 100 g of succinic anhydride (Sigma-Aldrich #108-30-5) (molar ratio 1:2) were combined in a reaction vessel and heated to 120° C., followed by the addition of 4 g of catalyst, methanesulfonic acid (CAS number 75-75-2, Sigma-Aldrich). The system was mixed for 1 hr under 10 mm Hg vacuum and mixing continued at 120° C. until no more water was distilled from the reaction mixture.

For process control the concentration of carboxyl groups was monitored by ASTM D 465. At the end of the process the residual concentration of carboxyl groups was negligible. The produced substance was a clear yellowish viscous (2000 cPs) liquid, which later crystallized into a white hard waxy material.

Group A, Example 3

Production of hydroxyl-terminated poly(thioester) from di(hydroxyethyl)disulfide and adipic acid 600 g Di(hydroxyethyl)disulfide (DiHEDS CP Chem L.L.C. Water-free grade) and 474 g of adipic anhydride (Adipure by DuPont, CAS #124-04-9) (molar ratio 6:5) were combined in a reaction vessel and 3.13 g of methanesulfonic acid (CAS number 75-75-2, Sigma-Aldrich) added. The mixture was heated to 120° C. with mixing for 1 hr, under 10 mm Hg vacuum and reaction maintained at 120° C. until no more water was distilled from the reaction mixture.

For process control the concentration of carboxyl groups was monitored by ASTM D 465. At the end of the process the residual concentration of carboxyl groups was negligible.

The produced substance was a clear yellowish viscous (~3000 cPs) liquid, which later crystallized into a white hard waxy material.

Group A, Example 4

Production of hydroxyl-terminated poly(thioester) from di(hydroxyethyl)disulfide, adipic acid and dimethylolpropionic acid 300 g Di(hydroxyethyl)disulfide (DiHEDS CP Chem L.L.C. Water-free grade), 426 g of adipic acid, and 196 g of DMPA (GEO Specialty Chemicals, CAS #4767-03-7) (molar ratio 4:6:3) were combined and heated at 160° C. with mixing for 2.5 hr, under 10 mm Hg vacuum. The temperature was increased to 180° C., and mixing continued at 180° C. until no more water was distilled from the reaction mixture.

The concentration of carboxyl groups was monitored by ASTM D 465. At the end of the process the residual concentration of carboxyl groups was equal to the concentration of the DMPA carboxyls.

The produced material was an amber highly viscous (200,000 cPs) liquid.

Group A, Example 5

Production of polysulfide-containing amidoamine from the carboxyl-terminated poly(thioester)

To the product from the Example 1 without isolation or cooling was added N-aminoethylpiperazine (AEP, CAS #140-31-8, Huntsman Corp. or Air Products and Chemicals, Inc.) in the amount of 1.05 mol AEP per one mol of carboxyl. Assuming the targeted acid number of 83.58 mg KOH/g was reached in the first stage, the ratio is 20.4 parts of AEP per 100 parts of produced polyester.

A typical second stage reaction time is 2-3 hours at 155-160° C. under atmospheric pressure. After reaching the targeted amine number, which for this product is 71.2 mg KOH/g, the reactor pressure was reduced to at least 10 mm Hg to distill off the water produced in the second stage reaction. The temperature during the vacuum period is maintained at 155-160° C.

For process control in this stage the amine number is monitored by ASTM D 2073. The process ends when the amine number approaches the targeted amine number and no more water was being removed under vacuum.

The produced material was a brown semi-solid substance with a melting range 40-50° C. that was soluble in conventional amidoamines and phenylalkylamines.

Group A, Example 6

Production of polysulfide-containing isocyanate prepolymer with terminal isocyanate groups from hydroxyl-terminated poly(thioester)

400 g of poly(thioester) from Example 2 were melted at 60° C. and mixed with 15 g 3ST Zeochem Purmol Zeolite powder (produced by Zeochem, Louisville, Ky.) to remove traces of water. The mixture was later combined in a reaction vessel with 234 g of isophorone diisocyanate (Vestanat® IPDI, Degussa Corp., CAS #4098-71-9) (molar ratio 1:2.05). The reaction mixture was heated to 90° C. and agitated for 3 hrs under argon flow.

The concentration of isocyanate groups was monitored by ASTM D 2572-97. At the end of the process the concentration of isocyanate groups was 2.4 N, which is equal to half of the initial concentration of isocyanate groups.

The produced material was a whitish opaque very viscous (150,000 cPs) liquid.

Group A, Example 7

Production of polysulfide-containing isocyanate prepolymer from hydroxyl-terminated poly(thioester)

445 g of poly(thioester) from Example 3 were melted at 60° C. and mixed with 15 g 3ST Zeochem Purmol Zeolite powder (produced by Zeochem, Louisville, Ky.) to remove traces of water. The produced mixture was combined in a reaction vessel with 372 g of methylene-bis(4-cyclohexylisocyanate) (Desmodur W, Bayer Corp., CAS #5124-30-1) and heated to 90° C. and stirred for 1 hr, under argon flow. 95.2 g of dimethylolpropionic acid (DMPA, GEO Specialty Chemicals, CAS #4767-03-7), 200 g of N-methylpyrrolidinone (NMP BASF, CAS #872-50-4) and 36 g of triethylamine (TEA, JT Baker, CAS #121-44-8) were added to the reaction mixture. The temperature was reduced to 70° C. and the reaction mixture was mixed at this temperature for 1 hour under argon.

The concentration of isocyanate groups was monitored by ASTM D 2572-97. At the end of the process the concentration of isocyanate groups was 0.68 N, which exactly equaled the calculated concentration of terminal isocyanate groups in the produced prepolymer with pendant carboxyl groups inhibited from reaction by the triethylamine.

The produced material was a whitish viscous liquid with viscosity of approximately 70,000 cPs.

It is evident from the above results that the subject compounds can be readily prepared in good yield under convenient conditions. The subject monomers provide desirable properties to a large number of products enhancing the properties of products prepared from conventional monomers. By replacing all or a portion of diols or dibasic acids used in making condensation polymers, the resulting products have improved physical and chemical characteristics. By modifying the subject monomers with addition polymerizable monomers, the properties of the resulting polymeric product are similarly enhanced.

Group B—Examples 1-7

Group B Experimental

The majority of experimental work on the products described in this patent was based on a commercially-available DiHEDS, a product of the Chevron Phillips Chemicals LP, which contains approximately 95-97% of di(hydroxyethyl)disulfide, and 3-5% of the higher molecular weight di(hydroxyethyl)trisulfide and other, higher molecular weight di(hydroxyethyl)polysulfides. However, in regards to the subject of this invention, all di(hydroxyethyl)polysulfides behave similarly.

Di(hydroxyethyl)polysulfides with sulfidity higher than that of DiHEDS, which were used to create some of the poly(thioesters) that are the subject of this invention, were obtained by dissolving elemental sulfur in DiHEDS at 115-120° C.

The homopolymers of di(hydroxyethyl)polysulfides (polythioethers) that were used to create some of the poly (thioesters) that are the subject of this invention were obtained by polyetherification of DiHEDS (Reaction 1) in the presence of acidic catalysts (preferably phosphoric acid) at 140-180° C.

Any person skilled in the art will recognize that most of the processes described in the present invention can take place not only at 80-130° C., in the presence of acidic catalysts, but also outside of this preferred range of temperatures. However, at temperatures below 80° C. the reaction rate slows down to a degree that the chemical production process becomes impractical, and at temperatures above 130° C. the input of the reaction of homopolycondensation of di(hydroxyethyl) polysulfides (i.e. formation of poly(thioethers)) becomes more and more pronounced, and the determination of the chemical structure of the products formed at higher temperatures becomes more and more problematic. An exception is when the reaction is conducted with methanesulphonic acid as the catalyst. In this case, the homopolycondensation reaction is minimal up to about 180° C.

Group B, Example 1

Production of carboxyl-terminated poly(thioester) from di(hydroxyethyl)disulfide and fatty acid Dimer 27 g of di(hydroxyethyl)disulfide (DiHEDS, produced by Chevron Phillips Chemicals LP, Regular grade) and 200 g fatty acid dimer (CAS #61788-89-4, Pripol-1013 from Uniqema, ICI Company) were combined in a jacketed reaction vessel and agitated. The molar ratio of components was 1:2.

0.2 g of 98% p-toluenesulfonic acid monohydrate (CAS #6192-52-5, obtained from Sigma-Aldrich) was used as a catalyst. The esterification reaction proceeded at 125-130° C. (260-270° F.) for 3-4 hours with constant mixing. 10 mm Hg vacuum was applied in order to facilitate the removal of water from the reaction mixture. For process control during this stage the concentration of carboxyl groups was monitored (ASTM D 465).

The process ended when the concentration of acid approached the calculated acid number of the carboxyl-terminated polythioester, and no further distillate was formed. The acid number of the produced material equaled 83.6 mg KOH/g, while the projected acid number was 83.58. The material produced was a brown liquid with 6000 cPs viscosity.

Group B, Example 2

Production of hydroxyl-terminated poly(thioester) from di(hydroxyethyl)disulfide and succinic anhydride 308 g di(hydroxyethyl)disulfide (DiHEDS, CPChem L.L.C., Water-free grade) and 100 g of succinic anhydride (Sigma-Aldrich #108-30-5) (molar ratio 1:2) were combined in a reaction vessel and heated to 120° C., followed by the addition of 4 g of catalyst, methanesulfonic acid (CAS #75-75-2, Sigma-Aldrich). The system was mixed for 1 hr under 10 mm Hg vacuum and mixing continued at 120° C. until no more water was distilled from the reaction mixture. For process control the concentration of carboxyl groups was monitored by ASTM D 465. At the end of the process the residual concentration of carboxyl groups was negligible. The produced substance was a clear yellowish viscous (2000 cPs) liquid, which later crystallized into a white hard waxy material.

Group B, Example 3

Production of hydroxyl-terminated poly(thioester) from di(hydroxyethyl)disulfide and adipic acid 600 g di(hydroxyethyl)disulfide (DiHEDS, CP Chem L.L.C. Water-free grade) and 474 g of adipic acid (Adipure by DuPont, CAS #124-04-9) (molar ratio 6:5) were combined in a reaction vessel and 3.13 g of methanesulfonic acid (CAS number 75-75-2, Sigma-Aldrich) added. The mixture was heated to 120° C. with mixing for 1 hr, under 10 mm Hg vacuum and reaction maintained at 120° C. until no more water was distilled from the reaction mixture. For process control the concentration of carboxyl groups was monitored by ASTM D 465. At the end of the process the residual concentration of carboxyl groups was negligible. The produced substance was a clear yellowish viscous (~3000 cPs) liquid, which later crystallized into a white hard waxy material.

Group B, Example 4

Production of hydroxyl-terminated poly(thioester) from di(hydroxyethyl)disulfide and maleic anhydride 1900 g di(hydroxyethyl)disulfide (DiHEDS CP Chem L.L.C. Water-free grade) and 907 g of maleic anhydride (Alfa Aesar, CAS #108-31-6) (molar ratio 4:3) were combined in a reaction vessel. The mixture was heated to 57° C. with mixing for 1 hr, under Argon, until maleic anhydride dissolved. The reaction mixture was intensely agitated for 40 minutes without external heat source, and the temperature has ridden to 80° C. 14 g of methanesulfonic acid (Chevron Phillips Chemicals, CAS number 75-75-2,) were added and the mixture was heated to 90° C. for minutes. Argon was turned off when the condensation products were observed on the walls of the reactor, and 10 mm Hg vacuum was applied for 1 hour at 80° C., until no more water was distilled from the reaction mixture. For process control the concentration of carboxyl groups was monitored by FTIR. At the end of the process the residual concentration of carboxyl groups was negligible (the peaks 1785 and 1850 cm$^{-1}$ attributed to the maleic anhydride and 1705 cm$^{-1}$ attributed to the carboxyl's carbonyl group have disappeared). The produced substance was a clear not very viscous (~800 cPs) liquid.

Figure 1:
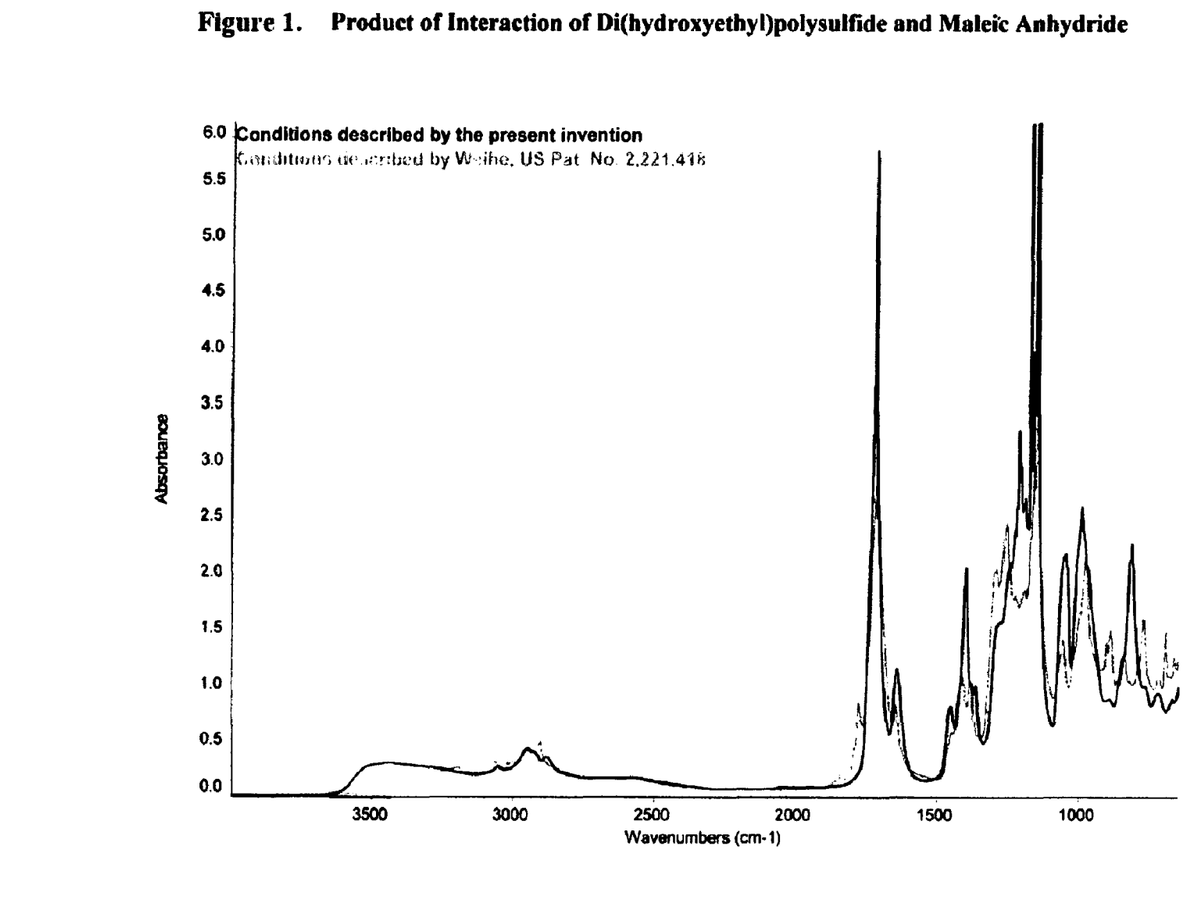
FIG. 1 compares IR spectra of products made according to Weihe and poly(thioesters) according to the present invention.

The spectrum of this product is shown in FIG. 1 alongside with a spectrum of a material produced from the same raw materials under conditions described by Weihe (U.S. Pat. No. 2,221,418, Example 4—equimolar amounts, 5 hours 140° C.), which is an extremely viscous (>500,000 cPs) dark brown balsam. These spectra clearly demonstrate that the compositions of matter generated from the same raw materials under different conditions are quite dissimilar. Similar spectral differences are present in the products of interaction of succinic anhydride and di(hydroxyethyl)disulfide when they were obtained under conditions described by Smith (180-220° F. in the presence of triethylamine).

Group B, Example 5

Production of hydroxyl-terminated poly(thioester) from di(hydroxyethyl)disulfide, succinic anhydride and dimethylolpropionic acid 308 g di(hydroxyethyl)disulfide (DiHEDS CP Chem L.L.C. Water-free grade), 400 g of succinic anhydride, and 402 g of dimethylolpropionic acid (DMPA, GEO Specialty Chemicals, CAS #4767-03-7) (molar ratio 2:4:3) were combined and heated to 130° C. with mixing for 2.5 hr, under 10 mm Hg vacuum. Under these conditions, all hydroxyls of DiHEDS have reacted with the carboxyl groups of the succinic acid, forming a carboxyl-terminated polythioester dissolved in the residual dimethylolpropionic and succinic acids.

Then the temperature was increased to 180° C., 1% of methanesulphonic acid catalyst was added to the reaction mixture, and mixing continued at 180° C. until no more water was distilled from the reaction mixture. At this stage of the process, dimethylolpropionic acid, acting as a diol, has reacted with the residual succinic acid and carboxyl-terminated polythioester, forming an oligomeric resin with a polythioester backbone that is terminated with two hydroxyl and three carboxyl groups.

The concentration of carboxyl groups was monitored by ASTM D 465. At the end of the process the residual concentration of carboxyl groups was equal to the concentration of the DMPA carboxyls. The produced material was an amber highly viscous (200,000 cPs) liquid.

Group B, Example 6

Production of polysulfide-containing amidoamine from the carboxyl-terminated poly(thioester)

To the product from the Example 1 without isolation or cooling was added N-aminoethylpiperazine (AEP, CAS #140-31-8, Huntsman Corp. or Air Products and Chemicals, Inc) in the amount of 1.05 mol AEP per one mol of carboxyl. Assuming the targeted acid number of 83.58 mg KOH/g was reached in the first stage, the ratio is 20.4 parts of AEP per 100 parts of produced polyester. A typical second stage reaction time is 2-3 hours at 155-160° C. under atmospheric pressure. After reaching the targeted amine number, which for this product is 71.2 mg KOH/g, the reactor pressure was reduced to at least 10 mm Hg. to distill off the water produced in the second stage reaction. The temperature during the vacuum period is maintained at 155-160° C. For process control in this stage the amine number is monitored by ASTM D 2073. The process ends when the amine number approaches the targeted amine number and no more water was being removed under vacuum. The produced material was a brown semi-solid substance with a melting range 40-50° C. that was soluble in conventional diamines.

Group B, Example 7

Production of polysulfide-containing isocyanate prepolymer from hydroxyl-terminated poly(thioester)

400 g of poly(thioester) from Example 2 were melted at 60° C. and mixed with 15 g 3ST 25 Zeochem Purmol Zeolite powder (produced by Zeochem, Louisville, Ky.) to remove traces of water. The mixture was later combined in a reaction vessel with 234 g of isophorone diisocyanate (Vestanat® IPDI, Degussa Corp., CAS #4098-71-9) (molar ratio 1:2.05). The reaction mixture was heated to 90° C. and agitated for 3 hrs under argon flow. The concentration of isocyanate groups was monitored by ASTM D 2572-97. At the end of the process the concentration of isocyanate groups was 2.4 N, which is equal to half of the initial concentration of isocyanate groups. The produced material was a whitish opaque very viscous (150,000 cPs) liquid.

Group B, Example 8

Production of polysulfide-containing isocyanate prepolymer from hydroxyl-terminated poly(thioester)

445 g of poly(thioester) from Example 3 were melted at 60° C. and mixed with 15 g 3ST Zeochem Purmol Zeolite powder (produced by Zeochem, Louisville, Ky.) to remove traces of water. The produced mixture was combined in a reaction vessel with 372 g of methylene-bis(cyclohexylisocyanate) (Desmodur W, Bayer Corp., CAS #5124-30-1) and heated to 90° C. and stirred for 1 hr, under argon flow.

95.2 g of dimethylolpropionic acid (DMPA, GEO Specialty Chemicals, CAS #4767-03-7), 200 g of N-methylpyrrolidinone (NMP BASF, CAS #872-50-4) and 36 g of triethylamine (TEA, JT Baker, CAS #121-44-8) were added to the reaction mixture. The temperature was reduced to 70° C. and the reaction mixture was mixed at this temperature for 1 hour under argon. The concentration of isocyanate groups was monitored by ASTM D 2572-97. At the end of the process the concentration of isocyanate groups was 0.68 N, which exactly equaled the calculated concentration of terminal isocyanate groups in the produced prepolymer with pendant carboxyl groups inhibited from reaction by the triethylamine. The produced material was a whitish viscous liquid with viscosity of approximately 70,000 cPs.

Group B, Example 9

Figure 2:
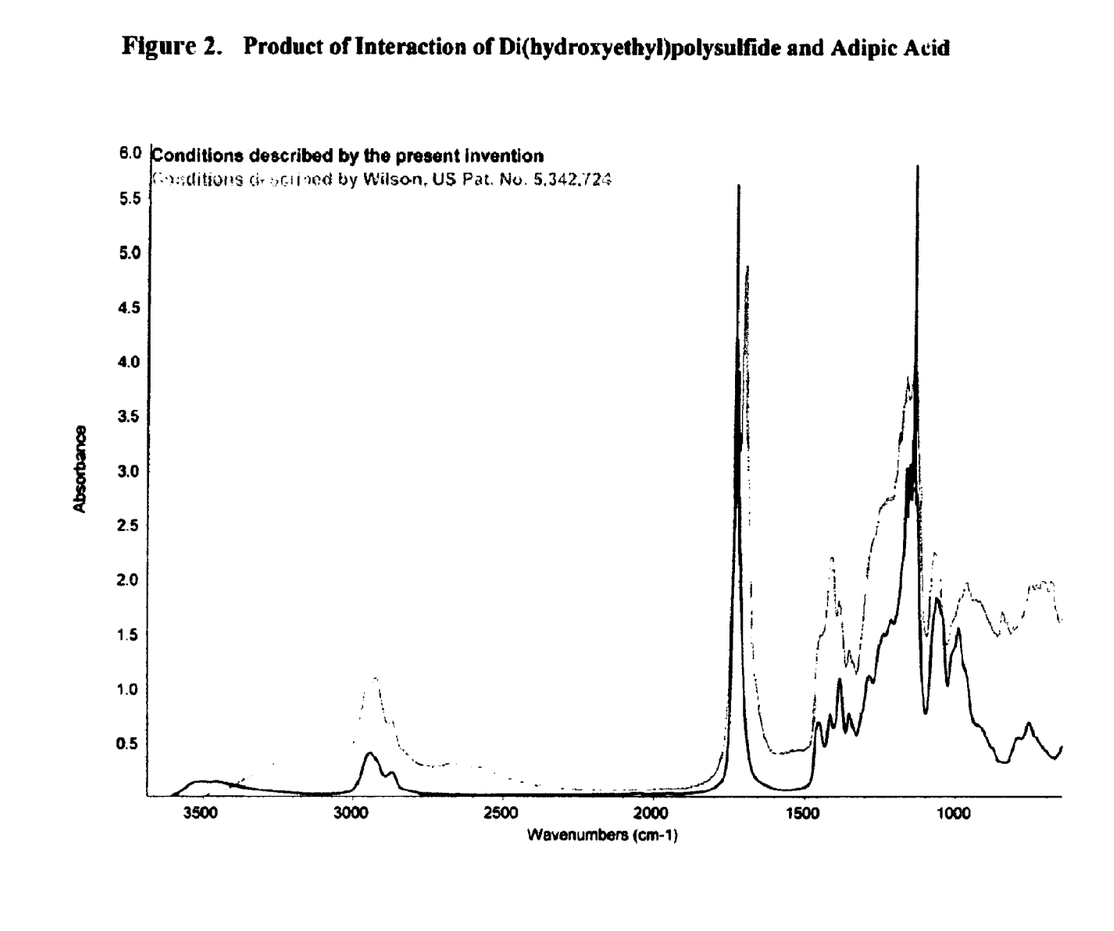
FIG. 2 compares IR spectra of products made according to Wilson and poly(thioesters) according to the present invention.

Production of hydroxyl-terminated poly(thioester) from di(hydroxyethyl)polysulfide and adipic acid 504 g of di(hydroxyethyl)polysulfide (obtained by dissolving 1 mol of sulfur in 1 mol of DiHEDS) and 313 g of adipic acid (Adipure by DuPont, CAS #124-04-9) (molar ratio 5:4) were combined in a reaction vessel and 3 g of 70% solution of methanesulfonic acid (produced by Chevron Phillips Chemical) were added to the reaction mixture. The mixture was heated to 120° C. with mixing for 1 hr, under 10 mm Hg vacuum and reaction maintained at 120° C. until no more water was distilled from the reaction mixture. For process control the concentration of carboxyl groups was monitored by ASTM D 465. At the end of the process the residual concentration of carboxyl groups was negligible. The produced substance was a brown viscous liquid, which did not crystallize. The spectrum of this material is shown in FIG. 2.

By way of comparison, di(hydroxyethyl)disulfide (a compound excluded by Wilson from the list of sulfur-containing diols) and adipic acid were combined under conditions described by Wilson (180° C., nitrogen atmosphere followed by vacuum, lead acetate/antimony oxide catalyst). The spectrum of the resulting materials is shown in FIG. 2, alongside with a spectrum of the inventive product. The resulting polymers proved to have absolutely dissimilar structures.

Group B, Example 10

Production of the maleic-terminated polythioester with di(hydroxyethyl)polysulfide/adipic acid polyester backbone 673 g of poly(thioester) from Example 9 were combined with 105 g of maleic anhydride. and heated to 90° C. with stirring under argon, until FTIR spectrum has shown complete disappearance of the peaks 1785 and 1850 cm$^{-1}$ attributed to the anhydride group of maleic anhydride.

The produced material was a whitish viscous liquid with viscosity of approximately 10,000 cPs, which demonstrated the typical reactions of maleic-terminated oligomers.

Group B, Example 11

Production of carboxyl-terminated poly(thioester) from di(hydroxyethyl)polysulfide and adipic acid 452 g of di(hydroxyethyl)polysulfide (obtained by dissolving 1 mol of sulfur in 1 mol of DiHEDS) and 532 g of adipic acid (Adipure by DuPont, CAS #124-04-9) (molar ratio 2:3) were combined in a reaction vessel and 5.3 g of 70% solution of methanesulfonic acid (produced by Chevron Phillips Chemical) were added to the reaction mixture. The mixture was heated to 115° C. with mixing for 1 hr, under 10 mm Hg vacuum and reaction maintained at 115° C. until no more water was distilled from the reaction mixture. For process control the concentration of carboxyl groups was monitored by ASTM D 465. At the end of the process the molar concentration of carboxyl groups was 2.8, while theoretically it should be 2.71. The produced substance was a brown viscous liquid, which did not crystallize.

Group B, Example 12

Production of the mercaptan-terminated polythioester with di(hydroxyethyl)polysulfide/adipic acid polyester backbone 900 g of poly(thioester) from Example 11 were combined with 190 g of bis-mercaptoethanol (BME, produced by Chevron Phillips Chemical). Additional 2.3 g of 70% solution of methanesulfonic acid (produced by Chevron Phillips Chemical) were added to the reaction mixture, which was heated to 90° C. with stirring under argon for 1 hour. Then 10 mm Hg vacuum was applied and reaction maintained at 90° C. until no more distillate was produced, and until FTIR spectrum has shown complete disappearance of the 1705 cm$^{-1}$ peak, which is attributed to the carboxyl's carbonyl group.

The produced material was a brow viscous liquid with viscosity of approximately 10,000 cPs, which demonstrated the typical reactions of mercaptan-terminated oligomers.

Group B, Example 13

Production of a monomeric diester from di(hydroxyethyl) disulfide and acetic acid 154 g di(hydroxyethyl)disulfide (DiHEDS CPChem L.L.C., Water-free grade) and 120 g of glacial acetic acid (molar ratio 1:2) were combined in a reaction vessel and heated to 75° C., followed by the addition of 0.85 g of catalyst, methanesulfonic acid (CAS number 75-75-2, Sigma-Aldrich). The system was heating to 90° C. and mixed for 1 hr. The temperature was raised to 103° C. and 10 mm Hg vacuum was applied. The system cooled down to 75° C., and extra 50 g of glacial acetic acid were added. The reaction mixture was reheated, and vacuum was applied. This operation (including the addition of extra portions of acetic acid) was repeated 3 times, until changes in the FTIR spectrum after each reheating cycle became unnoticeable. The produced substance was a clear low viscosity liquid with specific gravity 1.21-1.22, which was a very effective plasticizer for a wide variety of halogenated polymers.

It is evident from the above results that the subject compounds can be readily prepared in good yield under convenient conditions. The subject monomers provide desirable properties to a large number of products enhancing the properties of products prepared from conventional monomers. By replacing all or a portion of diols or dibasic acids used in making condensation polymers, the resulting products have improved physical and chemical characteristics. By modifying the subject monomers with addition polymerizable monomers, the properties of the resulting polymeric product are similarly enhanced.

The references, articles, patent applications and patents, described throughout this specification are fully incorporated by reference, as if fully disclosed in their entirety herein.

Having now fully described the invention, it will be apparent to one of ordinary skill in the art that many changes and modifications can be made thereto without departing from the spirit or scope of the invention as set forth herein.

As one of ordinary skill in the art will appreciate, various changes, substitutions, and alterations could be made or otherwise implemented without departing from the principles of the present invention. Accordingly, the scope of the invention should be determined by the following claims and their legal equivalents.

Specific Embodiments

The following are nonlimiting, specific embodiments in accordance with the present disclosure:

1. A compound characterized by having a unit formed from a polysulfide diol and an organic dibasic carboxylic acid or its anhydride, wherein the hydroxyl groups are separated from said polysulfide by at least 2 carbon atoms, having a total of at least about 5 carbon atoms, said polysulfide having from 2 to 8 sulfur atoms.

2. A compound according to embodiment 1, wherein said dibasic acid is an organic dicarboxylic acid or anhydride of at least about 2 carbon atoms and said polysulfide diol is aliphatic of from 4 to 40 carbon atoms.

3. A compound according to embodiment 2, wherein said polysulfide has from 2 to 4 sulfur atoms.

4. A compound according to embodiment 1, wherein said compound is a condensation copolymer.

5. A compound according to embodiment 1, wherein said compound is an addition polymer.

6. A compound having at least one unit of the formula:

$$-ORS_nR^1OA- \text{ or } -OAORS_nR^1-$$

wherein:
O and S have their normal meaning of oxygen and sulfur;
n is at least 2 and not more than about 8;
R and $R^1$ are the same or different and are organic divalent radicals, each having from 2 to 20 carbon atoms; and
A is the residue of a dibasic carboxylic acid of from 1 to 40 carbon atoms.

7. A composition of the formulae:

$$MF_mORS_nR^1OM^1; \text{ or} \qquad (a)$$

$$MZAORS_nR^1F^1_mOAZ^1M^1, \qquad (b)$$

wherein
O and S have their normal meaning of oxygen and sulfur;
n is at least 2 and not more than about 8;
F is of the formula $-ORS_nR^1OA-$;
$F^1$ is of the formula $-ORS_nR^1OA-$;
m is at least 1;
Z and $Z^1$ are the same or different and are oxy or amino;
M and $M^1$ are the same or different and are hydrogen or an organic substituent;
R and $R^1$ are the same or different and are organic divalent radicals, each having from 2 to 20 carbon atoms; and
A is the residue of a dicarboxylic acid of from 2 to 40 carbon atoms.

8. A composition according to embodiment 7, wherein M and $M^1$ are hydrogen and
A is of from 2 to 12 carbon atoms and R and $R^1$ are aliphatic.

9. A composition according to embodiment 7, wherein A is a fatty acid dimer residue and R and $R^1$ are aliphatic.

10. A composition according to embodiment 7, wherein:
M is defined as $W^1R^2-$: and
$M^1$ is defined as $W^2R^3-$,
wherein:
$R^2$ and $R^3$ are the same or different and are an organic divalent radical having from 2 to 12 carbon atoms; and
W and $W^1$ are the same or different, and are amino and substituted amino of from about 1 to 6 carbon atoms, hydroxyl, carboxyl, isothiocyanate, isocyanate, oxo-carbonyl, non-oxo-carbonyl, siloxane, silane, cyclocarbonate, active olefin, or active halogen.

11. A copolymer comprising as a monomer a composition according to embodiment 7
wherein:
said organic substituent for M is defined as $W^1R^2-$ and for $M^1$ as $W^2R^3-$;
$R^2$ and $R^3$ are the same or different and are an organic divalent radical having from 2 to 12 carbon atoms; and
W and $W^1$ are the same or different, and are amino and substituted amino of from about 1 to 6 carbon atoms, hydroxyl, carboxyl, isothiocyanate, isocyanate, oxo-carbonyl, non-oxo-carbonyl, siloxane, silane, cyclocarbonate, active olefin, or active halogen.

12. A compound according to embodiment 11, wherein said polymer is a polyurethane.

13. A compound according to embodiment 11, wherein said polymer is a polyether.

14. A compound according to embodiment 11, wherein said polymer is a polyester.

15. A compound according to embodiment 11, wherein said polymer is an addition polymer.

16. A copolymer according to embodiment 11, wherein A is a dicarboxylic acid residue of from 2 to 8 carbon atoms and n is 2 to 4.

17. A compound according to embodiment 15, wherein at least one of W and $W^1$ is hydroxyl.

18. A compound according to embodiment 15, wherein at least one of W and $W^1$ is carboxyl.

19. A compound according to embodiment 15, wherein at least one of W and $W^1$ is an amine.

20. A compound of the formulae:

$$MF_mORS_nR^1OM^1; \text{ or} \qquad (a)$$

$$MF^1{}_mOAOM^1, \qquad (b)$$

wherein:
F is of the formula —$ORS_nR^1OA$—;
$F^1$ is of the formula —$OAORS_nR^1$—;
m is at least 1;
n is of 2 to 4;
R and $R^1$ are ethylene;
A is the residue of an aliphatic dicarboxylic acid of from 2 to 40 carbon atoms; and
M and $M^1$ are H.

21. A composition resulting from the reaction of the reactants di(hydroxyethyl)disulfide, succinic or adipic acid and dimethylolpropionic acid and an acid catalyst.

22. An object of a polymer comprising a compound according to embodiment 1.

23. A compound of the formula:

$$R^2-[-O-A-O-B-]_n-O-A-O-R^2$$

wherein
each $R^2$ is H or $R^1$-f,
wherein $R^1$ is any bi-valenced organic radical, and f is H or any reactive functional group;
each $R^2$ is the same or different;
A is either X or Y,
wherein X is —$(—(CH_2)_2—S—(CH_2)_2—O—)_m—(CH_2)_2—S_x—(CH_2)_2$—,
Y is —$C(O)—R^1—C(O)$—,
m is at least zero, and
x is between two and six;
B is either Y or X;
O, H, C, and S have their normal meaning of oxygen, hydrogen, carbon, and sulfur;
if A is X, then B is Y;
if A is Y, then B is X; and
n is at least one, except for the case when A is Y, B is X, $R^1$ is a dibasic carbonic acid that is a cyclic anhydride or forms a cyclic anhydride, and $R^2$ is H, in which case n is at least two.

24. The compound as set forth in embodiment 23, wherein $R^2$ is $R^1$-f;
A is —$C(O)—R^1—C(O)$—; and
B is —$(—(CH_2)_2—S_x—(CH_2)_2—O—)_m—(CH_2)_2—S_x—(CH_2)_2$—.

25. The compound as set forth in embodiment 23, wherein $R^2$ is $R^1$-f;
A is —$(—(CH_2)_2—S_x—(CH_2)_2—O—)_m(CH_2)_2—S_x—(CH_2)_2$—; and
B is —$C(O)—R^1—C(O)$—.

26. The compound as set forth in embodiment 23, wherein f is selected from the group consisting of hydroxyl, acrylic, methacrylic, allyl, vinyl, maleic, activated halogen, nitrile, cyclocarbonate, mercaptan, and amine groups.

27. A composition comprising the compound as set forth in embodiment 23.

28. The composition as set forth in embodiment 27, wherein said composition is selected from the group consisting of adhesives, sealants, caulks, coatings, paints, plastics, and elastomers.

29. A compound produced from the reaction between
a) di(hydroxyethyl)polysulfides, homopolymers of di(hydroxyethyl)polysulfides, or a mixture of di(hydroxyethyl)polysulfides and homopolomyers of di(hydroxyethyl)polysulfides; and
b) mono-basic or di-basic carbonic acids, their anhydrides, mixtures of dibasic carbonic acids and their anhydrides, or mixtures of mono-basic carbonic acids and their anhydrides;
wherein said reaction is conducted at a temperature of between about 80° C. and about 130° C., and wherein said reaction is conducted in the presence of a protonic acidic catalyst.

30. The compound as set forth in embodiment 29, wherein said acidic catalyst comprises a nonoxidizing acidic catalyst.

31. The compound as set forth in embodiment 29, wherein said nonoxidizing acidic catalyst comprises methanesulphonic acid.

32. The compound as set forth in embodiment 29, wherein said carbonic acids and their anhydrides are selected from the group consisting of $C_2$-$C_{40}$ saturated and unsaturated carbonic acids, substituted and unsubstituted carboxylic mono- and diacids and their anhydrides.

33. The compound as set forth in embodiment 29, wherein said di(hydroxyethyl)polysulfides are selected from the group consisting of di(hydroxyethyl)disulfide, di(hydroxethyl)trisulfide and di(hydroxyethyl)tetrasulfide.

34. A compound produced from the reaction between
a) di(hydroxyethyl)polysulfides, homopolymers of di(hydroxyethyl)polysulfides, or a mixture of di(hydroxyethyl)polysulfides and homopolomyers of di(hydroxyethyl)polysulfides; and
b) mono-basic or di-basic carbonic acids, their anhydrides, mixtures of dibasic carbonic acids and their anhydrides, or mixtures of mono-basic carbonic acids and their anhydrides;
wherein said reaction is conducted at a temperature of between about 80° C. and about 180° C., and wherein said reaction is conducted in the presence of methanesulphonic acid.

35. The compound as set forth in embodiment 34, wherein said carbonic acids and their anhydrides are selected from the group consisting of $C_2$-$C_{40}$ saturated and unsaturated carbonic acids, substituted and unsubstituted carboxylic mono- and diacids and their anhydrides.

36. The compound as set forth in embodiment 34, wherein said di(hydroxyethyl)polysulfides are selected from the group consisting of di(hydroxyethyl)disulfide, di(hydroxethyl)trisulfide and di(hydroxyethyl)tetrasulfide.

37. A compound of the formula:

$$f^1\text{-}R^1-NH\text{-}A\text{-}O-B-[-O\text{-}A\text{-}O-B-]_n-O\text{-}A\text{-}HN-R^1\text{-}f^1$$

wherein
A is —$C(O)—R^1—C(O)$—;
B is —$((CH_2)_2)_2—O(CH_2)_2—)_m—(CH_2)_2—S_x—(CH_2)_2$—;
$R^1$ is any bi-valenced organic radical;
m is at least zero;
n is at least one;
x is between two and six;
$f^1$ is a hydroxyl, a primary amine group, a secondary amine group or a tertiary amine group; and 38. A compound of the formula:

$$R^3-C(O)-[-O\text{-}A\text{-}O-B-]_n-O\text{-}A\text{-}O-C(O)-R^3$$

wherein
A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^3$ is $R^1\text{-}f^2$, $HN-R^1\text{-}f^3$, or $HN-R^4-NCO$,
wherein $f^2$ is a chemical structure or functional group;
$f^3$ is a chemical structure of functional group; and
$R^4$ is a radical that is located between two isocyanate groups of a di- or poly-isocyanate;
and
O, H, C, S, and N have their normal meaning of oxygen, hydrogen, carbon, sulfur and nitrogen.

39. The compound as set forth in embodiment 38, wherein $f^2$ is selected from the group consisting of hydroxyl, carboxyl, acrylic, methacrylic, allyl, vinyl, maleic, activated halogen, nitrile, cyclocarbonate, mercaptan, and tertiary amine groups.

40. The compound a set forth in embodiment 38, wherein $f^3$ is selected from the group consisting of isocyanate, epoxy, acrylic, methacrylic, alkoxysilane, tertiary amine, cyclocarbonate, mercaptan and vinyloxy.

41. A compound of the formula:

$$H-R^5-[-O\text{-}A\text{-}O-B-]_n-O\text{-}A\text{-}R^6-OH$$

wherein
A is $-((CH_2)_2-S_x-(CH_2)_2-O-)_m-(CH_2)_2-S_x-(CH_2)_2-$;
B is $-C(O)-R^1-C(O)-$;
$R^1$ is any bi-valenced organic radical;
m is at least zero;
n is at least one;
x is between two and six;
$R^5$ is $[O-CH_2-CHR^3]_{q-k}$ or $[O-CHR^3]_{q-k}$;
$R^6$ is $[O-CHR^3-CH_2]_q$ or $[O-CHR^3]_k$;
if $R^5$ is $[O-CH_2-CHR^3]_{q-k}$, then $R^6$ is $[O-CHR^B-CH_2]_q$;
if $R^5$ is $[O-CHR^3]_{q-k}$, then $R^6$ is $[O-CHR^3]_k$;
$R^3$ is either H or methyl;
q is at least one;
q is greater than or equal to k; and
O, H, C, and S have their normal meaning of oxygen, hydrogen, carbon, and sulfur.

42. A compound of the formula:

$$R^7-C(O)-O-X-O-C(O)-R^7$$

wherein $X=-(-(CH_2)_2-S_x-(CH_2)_2-O-)_m-(CH_2)_2-S_x-(CH_2)_2-$;
$R^7$ is either H, or any monovalent organic radical;
each $R^7$ is the same or different;
m is at least zero;
x is at least one; and
O, H, C, and S have their normal meaning of oxygen, hydrogen, carbon, and sulfur.

43. The compound as set forth in embodiment 42, wherein $R^7$ is a monobasic carboxylic acid having between two and nineteen carbons.

What is claimed is:
1. A composition of the formulae:

$$MZAORS_nR^1F^1{}_mOAZ^1M^1,$$

wherein
O and S have their normal meaning of oxygen and sulfur;
n is at least 2 and not more than 8;
$F^1$ is of the formula $-OAORS_nR^1-$
m is at least 1;
Z and $Z^1$ are amino; or Z is amino and $Z^1$ is oxy; or Z is oxy and $Z^1$ is amino;
M and $M^1$ are the same or different and are hydrogen or an organic substituent;
R and $R^1$ are the same or different and are organic divalent radicals, each having from 2 to 20 carbon atoms; and
A is the residue of a dicarboxylic acid of from 2 to 40 carbon atoms.

2. A composition according to claim 1, wherein M and $M^1$ are hydrogen and A is of from 2 to 12 carbon atoms and R and $R^1$ are aliphatic.

3. A composition according to claim 1, wherein A is a fatty acid dimer residue and R and $R^1$ are aliphatic.

4. A composition according to claim 1, wherein:
M is defined as $W^1R^2-$, and
$M^1$ is defined as $W^2R^3-$,
wherein:
$R^2$ and $R^3$ are the same or different and are an organic divalent radical having from 2 to 12 carbon atoms; and
$W^1$ and $W^2$ are the same or different, and are amino and substituted amino of from 1 to 6 carbon atoms, hydroxyl, carboxyl, isothiocyanate, isocyanate, oxo-carbonyl, non-oxo-carbonyl, siloxane, silane, cyclocarbonate, active olefin, or active halogen.

5. A copolymer comprising as a monomer a composition according to claim 1 wherein:
said organic substituent for M is defined as $W^1R^2-$ and for $M^1$ as $W^2R^3-$;
$R^2$ and $R^3$ are the same or different and are an organic divalent radical having from 2 to 12 carbon atoms; and
$W^1$ and $W^2$ are the same or different, and are amino and substituted amino of from 1 to 6 carbon atoms, hydroxyl, carboxyl, isothiocyanate, isocyanate, oxo-carbonyl, non-oxo-carbonyl, siloxane, silane, cyclocarbonate, active olefin, or active halogen.

6. A copolymer according to claim 5, wherein said polymer is a polyurethane.

7. A copolymer according to claim 5, wherein said polymer is a polyether.

8. A copolymer according to claim 5, wherein said polymer is a polyester.

9. A copolymer according to claim 5, wherein said polymer is an addition polymer.

10. A copolymer according to claim 5, wherein A is a dicarboxylic acid residue of from 2 to 8 carbon atoms and n is 2 to 4.

11. A copolymer according to claim 9, wherein at least one of $W^1$ and $W^2$ is hydroxyl.

12. A copolymer according to claim 9, wherein at least one of $W^1$ and $W^2$ is carboxyl.

13. A copolymer according to claim 9, wherein at least one of $W^1$ and $W^2$ is an amine.

* * * * *